United States Patent [19]
Shibutani et al.

[11] Patent Number: 5,371,550
[45] Date of Patent: Dec. 6, 1994

[54] TELEVISION RECEIVER WITH AUTO-TUNING SYSTEM

[75] Inventors: Atsushi Shibutani; Masami Inoue, both of Tokorozawa; Takashi Moto; Masanobu Sato, both of Tokyo; Kazuyuki Kurosawa, Tokyo, all of Japan

[73] Assignee: Casio Computer Co., Ltd., Tokyo, Japan

[21] Appl. No.: 994,142

[22] Filed: Dec. 21, 1992

[30] Foreign Application Priority Data

| Dec. 25, 1991 | [JP] | Japan | 3-343099 |
| Dec. 25, 1991 | [JP] | Japan | 3-343100 |
| Jan. 20, 1992 | [JP] | Japan | 4-7152 |
| Feb. 24, 1992 | [JP] | Japan | 3-36368 |
| Jun. 29, 1992 | [JP] | Japan | 3-170496 |

[51] Int. Cl.$^5$ .................. H04N 5/445; H04N 5/50
[52] U.S. Cl. .................. 348/570; 348/735; 455/161.2; 455/158.4
[58] Field of Search .............. 348/563, 564, 569, 570, 348/731, 732, 735; 455/158.4, 158.5, 154.2, 161.2, 161.3, 162.1, 168.1, 186.1, 186.2; H04N 5/445, 5/50

[56] References Cited

U.S. PATENT DOCUMENTS

| 4,317,227 | 2/1982 | Skerlos | 455/180 |
| 4,398,303 | 8/1983 | Chin et al. | 455/168 |
| 4,868,892 | 9/1989 | Tults et al. | 358/195.1 |
| 5,034,820 | 7/1991 | Cho | 358/192.1 |
| 5,152,511 | 9/1992 | Schwob | 455/158.5 |
| 5,191,423 | 3/1993 | Yoshida | 358/191.1 |
| 5,280,642 | 1/1994 | Hirata et al. | 455/161.3 |

FOREIGN PATENT DOCUMENTS 68287 3/1991 Japan ............... H04N 5/445

Primary Examiner—Mark R. Powell
Assistant Examiner—Jeffrey S. Murrell
Attorney, Agent, or Firm—Frishauf, Holtz, Goodman & Woodward

[57] ABSTRACT

A receiver such as a liquid crystal display television receiver, which a user carries with him, is used for learning at sight which television stations at a destination supply broadcasting service. The receiver performs automatic tuning operation of television signal waves to search available television channels, stores searched available television channels in a memory device, and displays a list of the available stored television channels. The receiver displays the available television channels stored in the memory device, and successively receives the available television channels, thereby displaying the television programs for a predetermined period. The receiver is equipped with a memory in which local areas, local television stations in the areas, frequency data and network relations between key stations and the local television stations are memorized. When an area memorized in the memory is designated, a station-selecting guide information is displayed, which indicates a network relation between the local television stations and the key stations. The receiver selects an arbitrary television station and detect the signal receiving intensity, and stores data of the selected television station and the relevant signal receiving intensity in the memory device. The receiver displays a channel number and frequency data of the selected television station in a displaying manner associated with the detected signal receiving intensity.

28 Claims, 18 Drawing Sheets

FIG.15

```
TOKYO
  1 NHK NET.
  3 NHK-EDUCATION ENT.
  4 TNN NET.
  6 BSN NET.
  8 NST NET.
 10 NT21 NET.
 12
 16 UHF
 38 UHF
 42 UHF
 46 UHF
```

TELEVISION RECEIVER WITH AUTO-TUNING SYSTEM

BACKGROUND OF THE INVENTION

1. Field of the Invention

The present invention relates to a receiver such as a television receiver to be installed on a car and a portable television receiver, which is provided with an auto-tuning system depending on a frequency synthesizer system or a voltage synthesizer system.

2. Description of the Related Art

An auto-tuning system has been known which automatically tunes in to a broadcasting station depending on a frequency synthesizer system or a voltage synthesizer system. The voltage synthesizer system is disclosed, for example, in U.S. Pat. No. 4,398,303. Also, the frequency synthesizer system is disclosed in U.S. Pat. No. 4,317,227.

The above conventional auto-tuning system automatically searches for broadcasting stations by operation of an "up/down" key, which designates tuning direction (i.e., which instructs to tune in to a higher or lower frequency station), to tune in to a broadcasting station of a higher or a lower frequency than the frequency of the presently tuned-in broadcasting station. Further, when broadcasting stations are previously set to corresponding channel keys, for example, a first broadcasting station is preset to a channel key 1, a second broadcasting station is preset to a channel key 2 and so on, the auto-tuning system can tune in to a desired broadcasting station at one touch operation of the channel key.

In recent, portable liquid crystal display television receivers and automobile television receivers (a television receiver installed in an automobile) have been used widely. These television receivers are not used at a fixed area, but are moved to and used at various locations. As the television receiver is moved, broadcasting stations which can be received by the receiver are changed and the signal receiving intensity of a radio frequency received by the television receiver varies. The conventional auto-tuning systems will encounter the above troubles, they therefore can not be used effectively.

Even though particular television stations are preset to the auto-tuning system, the television station can not be received when a television receiver having the auto-tuning system is moved to some other location. Even if the television receiver is moved within a limited area, television stations which can be received will change because mountains and buildings can be obstacles to receipt of radio frequencies.

There are some television stations in cities through out the country, which constitute respective television networks and function as key stations for providing broadcasting services within their own particular service areas.

Most of conventional television receivers indicate only a channel number on the displays during tuning operation. Therefore, when a user of the conventional television receiver travels or goes on business to other place, it is almost impossible for the user to know from his (or her) television receiver how many television stations are providing services in the area, what television channels are assigned to the respective television stations, and what television station constitutes the television network which is familiar to the user at the residence area. The conventional television receiver gives the user much trouble that demands him to do time consuming work for searching for a desired television channel.

SUMMARY OF THE INVENTION

The present invention has been made to overcome the above drawbacks involved in the conventional television receivers, and has an object to provide a television receiver such as a portable liquid crystal display television receiver, which indicates on its display unit information of television stations providing services at a particular area.

According to one aspect of the present invention, there is provided a receiver which comprises:
  searching means for performing automatic turning operation of television signal waves to search an available television channel, a television signal wave of which can be received;
  storing means for storing the available television channel searched by said searching means; and
  displaying means for indicating a list of the available television channels stored in said storing means.

According to another aspect of the present invention, there is provided a receiver which comprises:
  receiving means for receiving a television signal, the receiving means including tuning means for tuning in a television signal wave and control means for controlling said tuning means so as to successively receive plural channels of television signals; and
  display means for successively displaying the plural channels of television signals received by said receiving means for predetermined periods, respectively.

With the above structure of the receiver, a user of the receiver can learn from the indication on the displaying means which television channels are available at a first sight, i.e., which television channels can be received, and also he or she (he) can learn which television channels can be received at respective areas where the user moves to.

According to yet another aspect of the present invention, there is provided a receiver which comprises:
  network memory means for previously storing, at least, areas, data of broadcasting stations at the areas and data of network relations between key stations and the broadcasting stations;
  area designating means for designating an area stored in said network memory means; and
  display means for displaying station-selection guide information of an area designated by said area designating means, which information includes a network relation between the broadcasting stations of the area designated by said area designating means and relevant key stations.

With the above structure of the receiver of the invention, the user can learn from the indication on the displaying means what broadcasting stations are providing service at the area where the user has moved to, with which key stations the broadcasting stations have network relations, and he can select his desired television channel without any troubles even at his unfamiliar area.

According to still another aspect of the present invention, there is provided a receiver which comprises:
  station selecting means for selecting a broadcasting station based on a broadcasting signal wave;
  detecting means for detecting signal receiving intensity of a broadcasting signal wave of the broadcasting station at the time when the broadcasting station is selected by said station selecting means;

memory means stores the broadcasting stations selected by said station selecting means and the signal receiving intensity of the relevant broadcasting signal waves detected by said detecting means; and display means for displaying the broadcasting stations stored in said memory means in a displaying manner associated with the signal receiving intensity of the broadcasting signal waves detected by said detecting means.

With the above structure of the receiver, the user can learn signal receiving intensity of the respective television channels which he can receive at an area where he has moved to.

It would be apparent to those skilled in the art from the following description of preferred embodiments that the present invention may be modified in various manners and may be applicable to other apparatus.

BRIEF DESCRIPTION OF THE DRAWINGS

Other objects and structures of the present invention will be more fully understood from the description, when taken in conjunction with the accompanying drawings, in which:

FIG. 15 is a view illustrating another television indications displayed in the network displaying process of FIG. 13;

DETAILED DESCRIPTION OF PREFERRED EMBODIMENTS

Preferred embodiments of the present invention applied to a liquid crystal display television receiver will be described referring to the accompanying drawings.

<First Embodiment>

Figure 1:
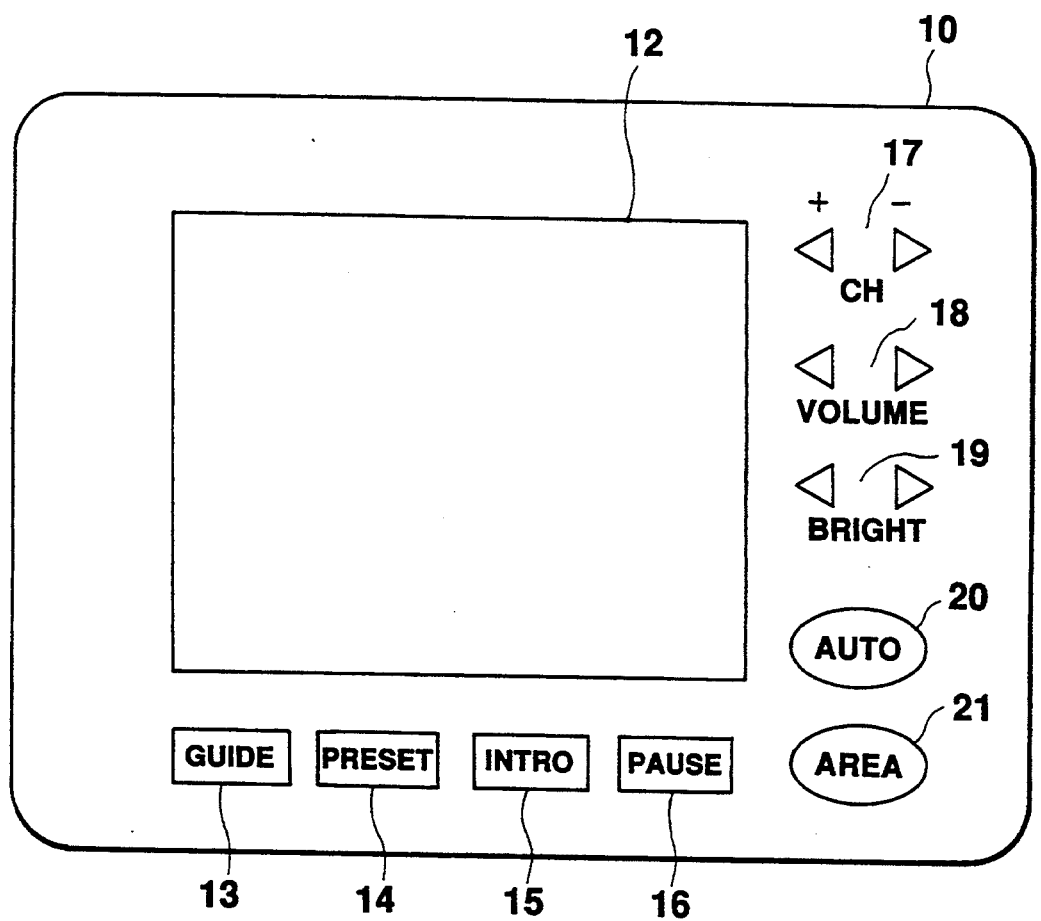
FIG. 1 is a front view showing an external appearance of a first embodiment of the present invention.

FIG. 1 is a front view showing an external appearance of the first embodiment of the present invention. A reference numeral 10 stands for a body of a receiver. The receiver is provided on the front surface with a displaying unit 12, such as a color liquid crystal displaying panel with a back light mounted thereon, a guide (GUIDE) key 13, a preset (PRESET) key 14, an introduction (INTRO) key 15, a pause (PAUSE) key 16, a channel (CH) key 17, a volume (VOLUME) key 18, a bright (BRIGHT) key 19, an auto (AUTO) key 20 and an area (AREA) key 21.

The guide key 13, as will be described later, is used for searching for a state of an electric wave at a give area, displaying a list of television channels which can be received at the area, displaying network stations at areas throughout the country and displaying guide information for a channel selection.

The preset key 14 is used for searching for television channels which can be received at the area and for automatically presetting the searched television channels.

The intro key 15 serves for displaying and introducing successively the television channels (available television channels) which can be received at the area, for predetermined periods of time. The process for displaying and introducing the available television channels is referred as to an "intro-scan" process, hereafter.

The pause key 16 is used to display a television channel for a while which is being displayed at a given time during the intro-scan process.

The channel key 17 consists of two keys, a "+" key and a "−" key, and is used to designate a broadcasting station to be selected by an auto-tuning operation. The "+" key of the channel key 17 is operated to designate a broadcasting station of a higher frequency television signal while the "−" key is to designate a broadcasting station of a lower frequency television signal.

The volume key 18 consists of two keys, a "+" key and a "−" key, and is used to control a sound volume level. The "+" key of the volume key 18 is used to raise the sound volume level while the "−" key is used to lower the sound volume level.

The bright key 19 serves to control the brightness of an television image on the display unit 12, and consists of two keys, a "+" key and a "−" key. The "+" key of the bright key 18 is used to obtain a brighter image while the "−" key is used to obtain a dimmer image on the display unit 12.

The auto key 20 is operated to set an auto-tuning mode for the auto-tuning operation. The area key 21 is used to set an area tuning mode for displaying the network on the display unit 12.

Figure 2:
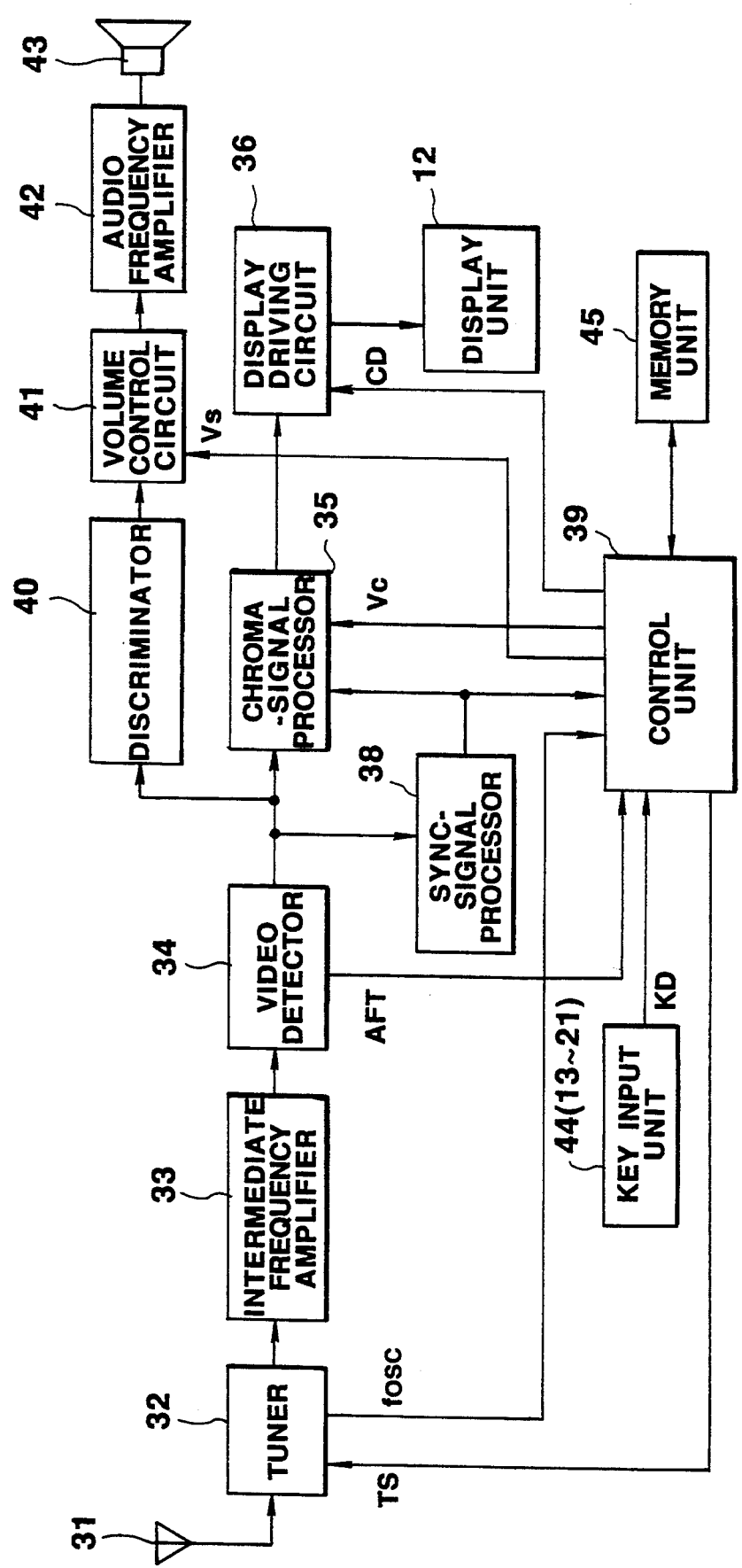
FIG. 2 is a circuit diagram of whole structure of the first embodiment.

FIG. 2 is a circuit diagram of whole structure of the present embodiment. In FIG. 2, television electric waves are transmitted through an antenna 31 to a tuner 32. The tuner 32 selects a television signal of a television channel which is designated in accordance with a tuning signal TS supplied from a control unit 39. The tuner 32 converts the television signal into an intermediate frequency signal (IF signal) to supply the same to an intermediate frequency signal amplifier (IF amplifier) 33, and simultaneously sends a local oscillation frequency fOSC to the control unit 39.

The intermediate frequency signal amplifier 33 amplifies and transmits the IF signal supplied from the tuner 32 to a video detector 34. The video detector 34 demodulates the IF signal from the IF amplifier 33 to obtain a composite video signal including an audio signal, and supplies the composite video signal to a chroma-signal processor 35, a sync-signal processor 38 and a discriminator 40, and further supplies an automatic fine tuning signal (AFT signal) to the control unit 39.

The discriminator 40 detects an audio signal from the composite video signal supplied from the video detector 34, and supplies the audio signal to a volume control circuit 41. The volume control circuit 41 controls a signal level of the audio signal sent from the discriminator 41 in accordance with an audio control signal Vs, and supplies the audio signal to an audio frequency amplifier 42. The audio frequency amplifier 42 of a certain gain amplifies the audio signal supplied from the volume control circuit 41. The audio signal amplified by the audio frequency amplifier 42 is audibly output through a speaker 43.

The sync-signal processor 38 separates horizontal sync signals and vertical sync signals from the composite video signal supplied from the video detector 34, and supplies these sync signals to the chroma-signal processor 35 and the control unit The chroma-signal processor 35 processes the composite video signal sent from the video detector 34 in accordance with the sync signals from the sync-signal processor 38 and a color control signal Vc from the control unit 39, thereby obtaining color signals R, G, B. Then, these color signals are sent to a display driving circuit 36. The display driving circuit 36 superimposes these color signals R, G, B on a character data signal CD, and drives the display unit 12 with the superimposed signal to display television program.

The control unit 39 execute controlling operation in accordance with key operation signal KD from a key input unit 44, which comprises the guide (GUIDE) key the preset (PRESET) key 14, the introduction (INTRO) key 15, the pause (PAUSE) key 16, the channel (CH) key 17, the volume (VOLUME) key 18, the bright (BRIGHT) key 19, the auto (AUTO) key 20 and the area (AREA) key 21. The control unit 39 outputs control signals while it is rewriting contents of a memory unit 45. The memory unit 45 consists of a nonvolatile memory such as, for example, EEPROM, and stores receiving channel data, mode data, sound volume data and bright level data at time when the power is turned off.

Figure 3:
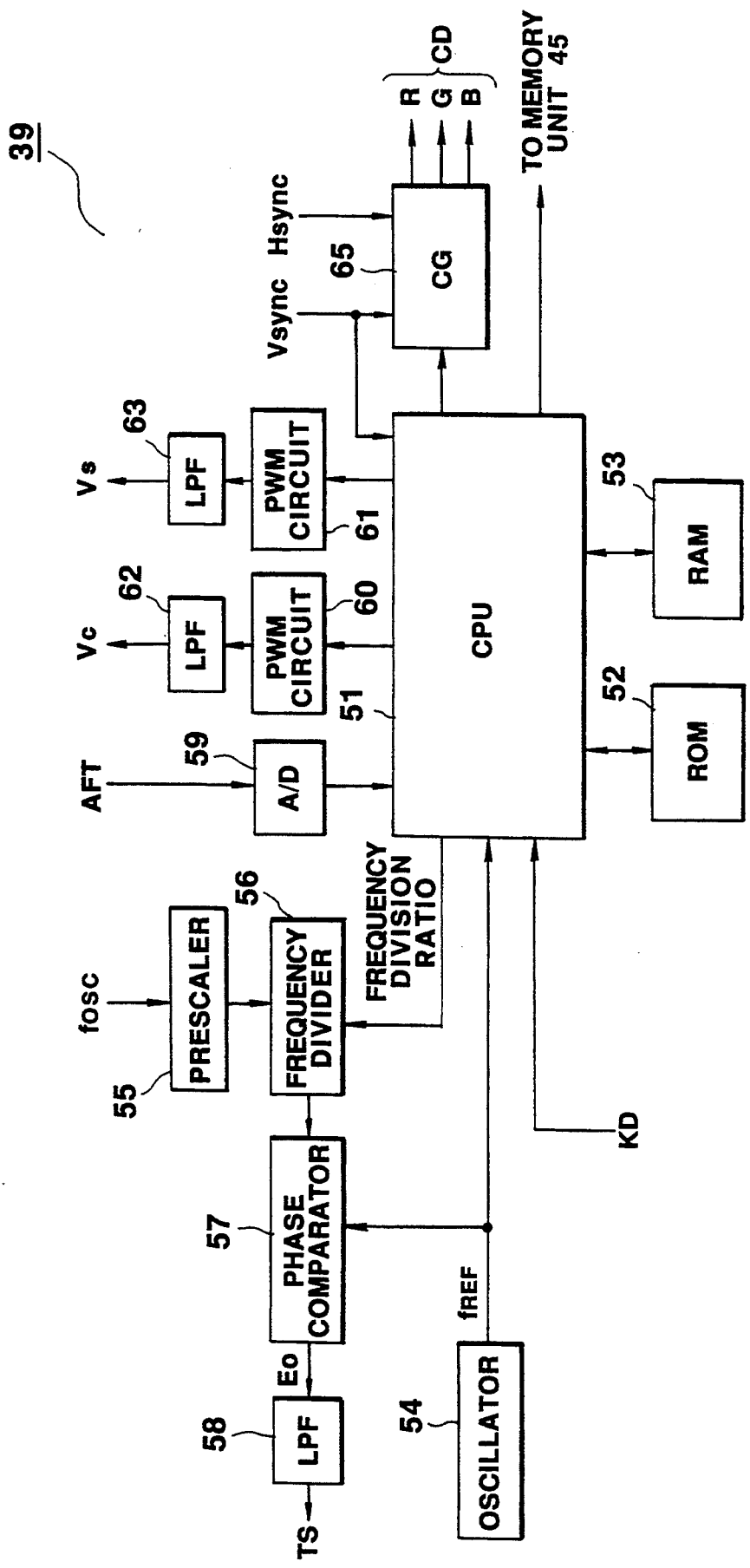
FIG. 3 is a detailed circuit diagram of a control unit of FIG. 2.

FIG. 3 is a detailed circuit diagram of the control unit 39 of FIG. 2. As shown in FIG. 3, the control unit 39 consists of a microcomputer including CPU 51. The CPU 51 is provided with a ROM 52 which stores an operation program, a RAM 53 including various registers for data processing and the memory unit 45. The CPU 51 directly receives a key operation signal KD for the key input unit 44, vertical sync signals Vsync from the sync-signal processor 38 and an operation clock signal fREF from an oscillator 54.

The local oscillation frequency signal fOSC sent from the tuner 32 is divided by 8 in a prescaler 55 and transferred to a frequency divider 56. The frequency divider 55 divides a frequency of the signal supplied from the prescaler 55 at a frequency division ratio corresponding to a designated channel, which ratio is set to the frequency divider 55 by the CPU 51. The output of the frequency divider 56 is transferred to a phase comparator 57. The phase comparator 57 compares the frequency divided signal from the frequency divider 56 with a reference signal, i.e., the operation clock signal fREF of the oscillator 54, thereby developing an error signal E0. The error signal E0 is supplied to a low pass filter (LPF) 58 to be smoothed. The smoothed signal is further supplied as the tuning signal TS to the tuner 32. The frequency divider 56, the phase comparator 57 and the low pass filter 58 constitutes a PLL circuit. The CPU 51 controls operation of the PLL circuit, thereby developing the tuning signal TS.

The automatic tuning signal AFT of the video detector 34 is supplied to an A/D convertor 59, where the signal AFT is converted into a digital signal, and the digital signal is supplied to CPU 51. The CPU 51 supplies a digital color control signal corresponding to operation of the bright key 19 to a pulse-width modulation circuit (PWM circuit) 60, and supplies a digital volume control signal corresponding to operation of the volume key 18 to a pulse-width modulation circuit (PWM circuit) 61.

The PWM circuit 60 modulates the digital color control signal to develop a pulse-width modulated signal, and supplies the developed pulse-width modulated signal to a low pass filter (LPF) 62. The low pass filter 62 smoothes the pulse-width modulation signal, thereby developing a voltage signal, i.e., the color control signal Vc, and supplied the color control signal Vc to the chroma-signal processor 35. The PWM circuit 60 and the low pass filter 62 constitutes a D/A converter.

Similarly, the PWM circuit 61 modulates the digital color control signal to develop a pulse-width modulated signal, and supplies the developed pulse-width modulated signal to a low pass filter (LPF) 63. The low pass filter 63 smoothes the pulse-width modulation signal, thereby developing a voltage signal, i.e., the audio control signal Vs, and supplied the audio control signal Vc to the volume control circuit 41. The PWM circuit 61 and the low pass filter 63 constitutes a D/A converter.

The CPU 51 outputs display data of character codes to a character generator (CG) 65. The character generator 65 develops character data signals CD of dot pattern for the respective color signals R, G, B from the display data based on the vertical sync signals Vsync and the horizontal sync signals Hsync received from the sync signal processor 38. These character data CD are supplied to display driving circuit 36 to display on the display unit 12 a list of available television channels and networks of the television stations.

<Whole Operation of First Embodiment>

Figure 4:
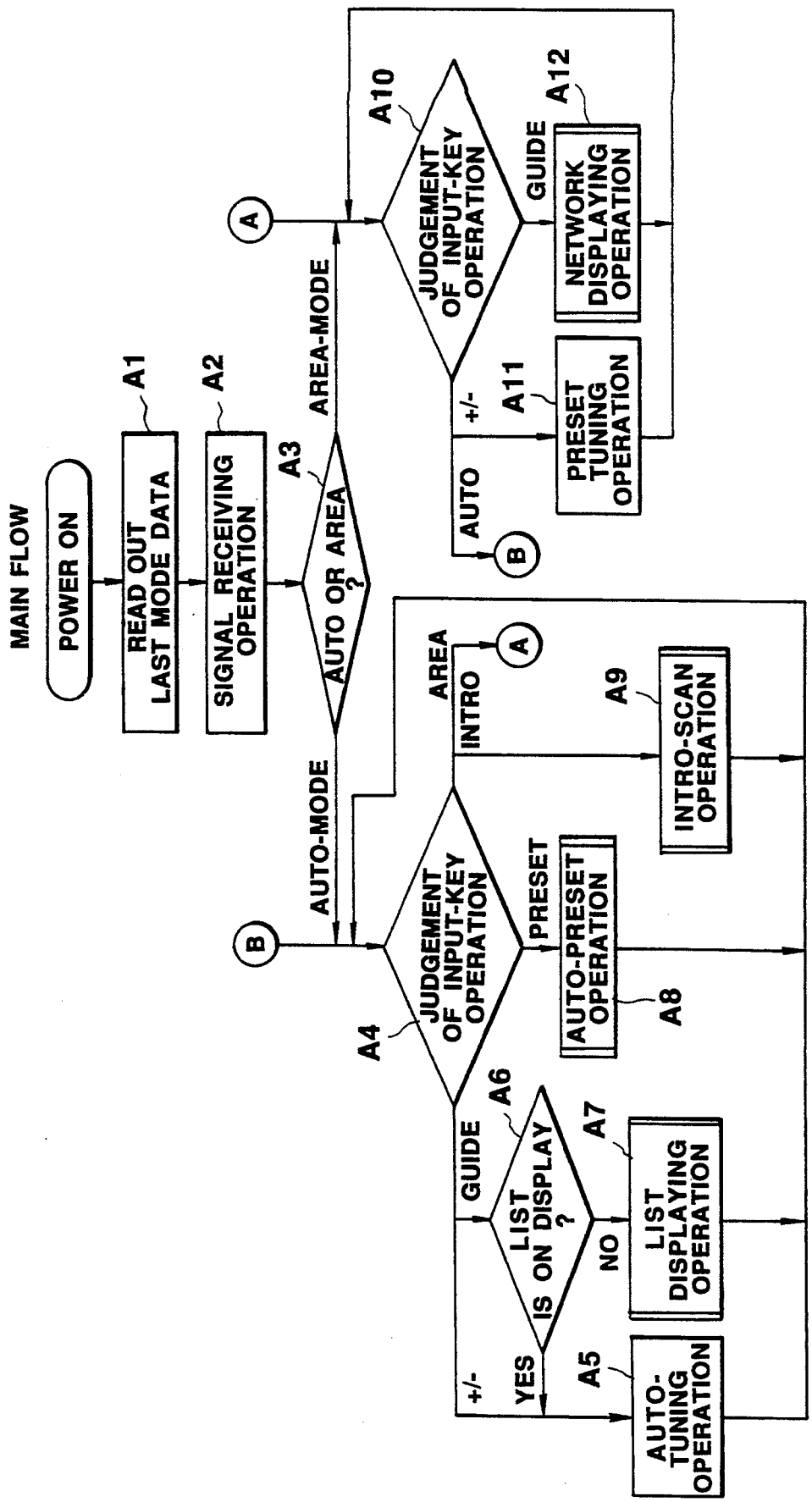
FIG. 4 is a flow chart of operation of the first embodiment.

The CPU 51 of the control unit 39 operates in accordance with the operation program stored in the ROM 52 after the power is turned on. The flow chart of FIG. 4 illustrates whole operation of the CPU 51. At step A1, the CPU 51 reads out, as last mode data, the receiving channel data, mode data, sound volume data and bright level data of the time when the power was turned off last. The CPU 51 executes a receiving operation of television signal waves depending on the read out data at step A2.

The CPU 51 judges at step A3 whether the auto-tuning mode has been set or an area tuning mode has been set.

When the auto-tuning mode has been set, the CPU 51 waits for another key operation, and when a key is operated, the CPU 51 judges at step A4 which key has been operated.

When it is judged that the channel key 17 has been operated, the CPU 51 performs the auto-tuning operation in a direction designated by the channel key 17, that is, the CPU 51 performs the auto-tuning operation to search another television channel of a higher frequency television signal (up tuning operation) or of a lower frequency television signal (down tuning operation), which is designated by the "+" key or the "−" key of the channel key 17. When another television channel has been received, the CPU 51 updates the last television channel to the newly received television channel at step A5. The auto-tuning operation will be described in detail later. When the newly received television channel has been set, the operation returns to step A4, where the CPU 51 waits for next key input operation.

When it is judged at step A4 that the guide key 13 has been operated, the CPU 51 judges at step A6 whether a list of available television channels are displayed on the display unit 12. When it is judged at step A6 that a list of available television channels are on the display unit 12, the CPU 51 judges that the guide key 13 has been operated to designate one of the available television channels displayed on the display unit 12, and goes to step A5, where the CPU 51 executes the auto-tuning operation. Then, the CPU 51 returns to step A4, where the CPU 51 waits for another key input operation.

When it is judged at step A6 that the guide key has been operated while the list of available television channels are not displayed on the display unit 12, the CPU 51 executes operation for displaying the list of the available television channels on the display unit 12. The operation (list displaying operation) for displaying the list of the available television channels on the display unit 12 will be described in detail later. After executing the list displaying process, the CPU 51 goes to step A4, where the CPU 51 waits for next key input operation.

When it is judged at step A4 that the preset key 14 has been operated, the CPU 51 executes an auto-preset process. The operation (auto-preset operation) for executing the auto-preset process will be described in detail later. After executing the auto-preset process, the CPU 51 goes to step A4, where the CPU 51 waits for another key input operation.

When it is judged at step A4 that the intro-key 15 has been operated, the CPU 51 executes the intro-scan process. The operation (intro-scan operation) for executing the intro-scan process will be described in detail later. After executing the intro-scan process, the CPU 51 goes to step A4, where the CPU 51 waits for another key input operation.

When it is judged at step A4 that the area key 21 has been operated, the auto-tuning mode is released and the area tuning mode is set. At step A10, the CPU 51 waits for the key input operation in the area tuning mode and judges which key has been operated.

When it is judged at step A10 that the "+" key or the "−" key of the channel key 17 has been operated, the available television channels which were stored in the memory unit 45 at step A8 are read out, and the CPU 51 executes the up tuning operation or the down tuning operation in accordance with operation of the channel key 17 (the "+" key or the "−" key), thereby receiving the relevant television channel at step A11. Then, the CPU 51 returns to step A10, where the CPU 51 waits for next key input operation.

When it is judged at step A10 that the guide key 13 has been operated, the CPU 51 executes a process for indicating networks of television stations (network displaying process) at step A12. The operation (network displaying operation) for executing the network displaying process will be described in detail later. After executing the network displaying process, the CPU 51 goes to step A10, where the CPU 51 waits for another key input operation.

When it is judged at step A10 that the auto key 13 has been operated, the area tuning mode is released and the auto-tuning mode is set. At step A10, the CPU 51 waits for the key input operation in the auto-tuning mode and judges which key has been operated.

<Auto-Tuning Operation>

Figure 5:
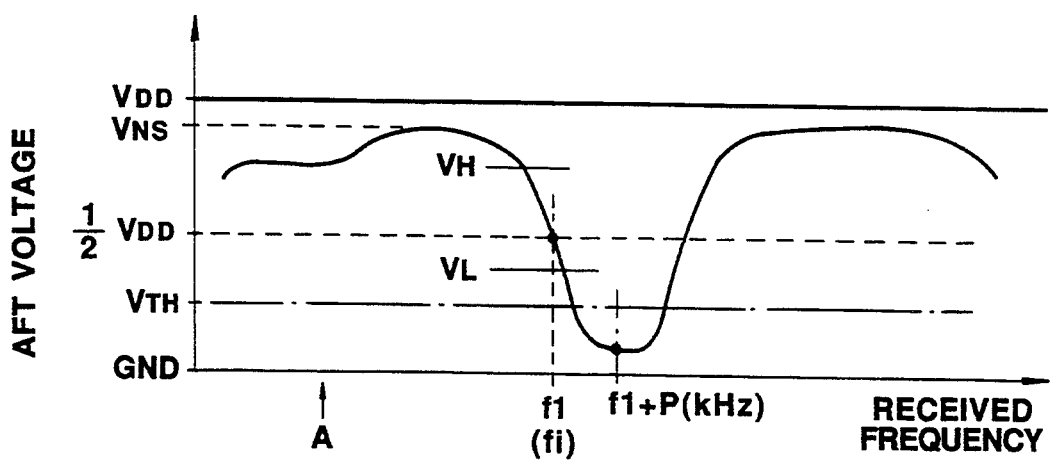
FIG. 5 is a view showing a waveform of an AFT voltage in the first embodiment.
Figure 6:
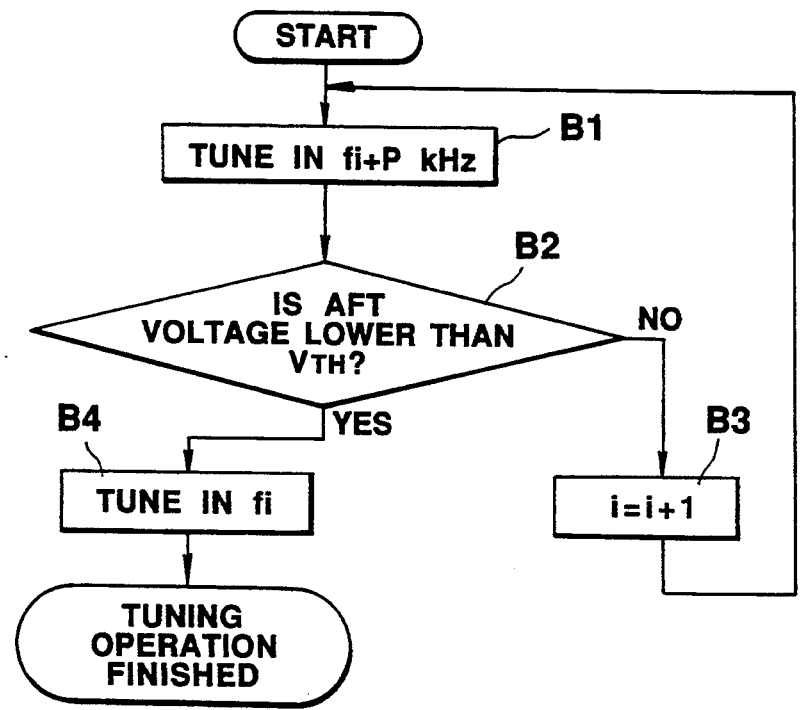
FIG. 6 is a flow chart of an auto-tuning process in the first embodiment.

The auto-tuning operation will be described referring to FIGS. 5 and 6. FIG. 5 is a view showing relationship between a received frequency and the AFT voltage. FIG. 6 is a flow chart of the up tuning operation which will be executed when the "+" key of the channel key 17 is operated.

When the "+" key of the channel key 17 is operated while a n-channel television signal is received, the CPU 51 of the control unit 39 will execute the auto-tuning operation in accordance with the flow chart of FIG. 6. The CPU 51 sets a frequency division ratio to the frequency divider 56 such that the tuner 32 will tune in a frequency "Fi+P" KHz, where a frequency Fi KHz is a central frequency of a (n+1)-television channel (i-television channel) next to the n-television channel television which is now tuned in and a frequency P KHz is a given frequency, which is set to, for example, 200 KHz. The CPU 51 sends the tuning signal TS to the tuner 32 at step B1.

When a television signal wave is present at the i-television channel, the AFT voltage level at the frequency "Fi+P" KHz will decrease lower than a threshold value Vth which is lower than a lower limit reference voltage V1, as shown in FIG. 6. The voltage of the AFT signal is stable without being affected by a modulation factor of a video signal. Then, it is judged at step B2 whether the AFT voltage at the frequency "Fi+P" KHz is lower than the predetermined threshold value Vth in order to determine whether a television signal is present at the i-television channel.

When it is judged at step B2 that the AFT voltage at the frequency "Fi+P" KHz is not lower than the predetermined threshold value Vth, it is determined that a television signal is not present at the i-television channel, and the i-television channel is incremented by +1 at step B3. Then, operation returns to step B1, whether it is judged whether a television channel is present at a (i+1)-television channel.

When it is judged at step B2 that the AFT voltage at the frequency "Fi+P" KHz is lower than the threshold value Vth, it is determined that a television signal is present at the i-television channel. The CPU 51 sets a frequency division ratio to the frequency divider 56 such that the tuner 32 will tune in a frequency of the i-television channel, and sends the tuning signal TS to the tuner 32 at step B4. As described above, the control unit 39 finishes the auto-tuning operation.

The auto-tuning operation has been described with reference to the flow chart of FIG. 6, which will be executed when the "+" key of the channel key 17 is operated, but when the "−" key of the channel key 17 is operated, the i-television channel is incremented by "−1" in place of "+1" at step B3, and the down tuning operation will be executed, similarly.

Since, in the auto-tuning operation, the AFT voltage at a frequency which is higher than the central frequency of a television broadcasting wave by P KHz is kept stable without being affected by a video signal, a television signal of poor electric field intensity can be received in a good condition.

While a frequency "Fi+P" KHz is tuned in during the tuning operation of FIG. 6, a television receiver tunes in a frequency which is shifted a little from that to be tuned in. Therefore, to avoid a disturbed indication appearing on the display unit 12, it is better to control the display driving circuit 36 so as to make the display unit 12 to display nothing during the auto-tuning operation.

A following operation, in which television signal of weak electric field intensity is not received and a next television channel is selected, may be executed in place of the above mentioned tuning operation of FIG. 6. More specifically, vertical sync signals Vsync is input to the CPU 51 from the sync-signal processor 38, and the CPU 51 judges whether the AFT voltage is lower than the predetermined threshold value Vth, and then the number of the vertical sync signals Vsync is counted, thereby avoiding a poor indication appearing on the display unit 12.

Figure 7:
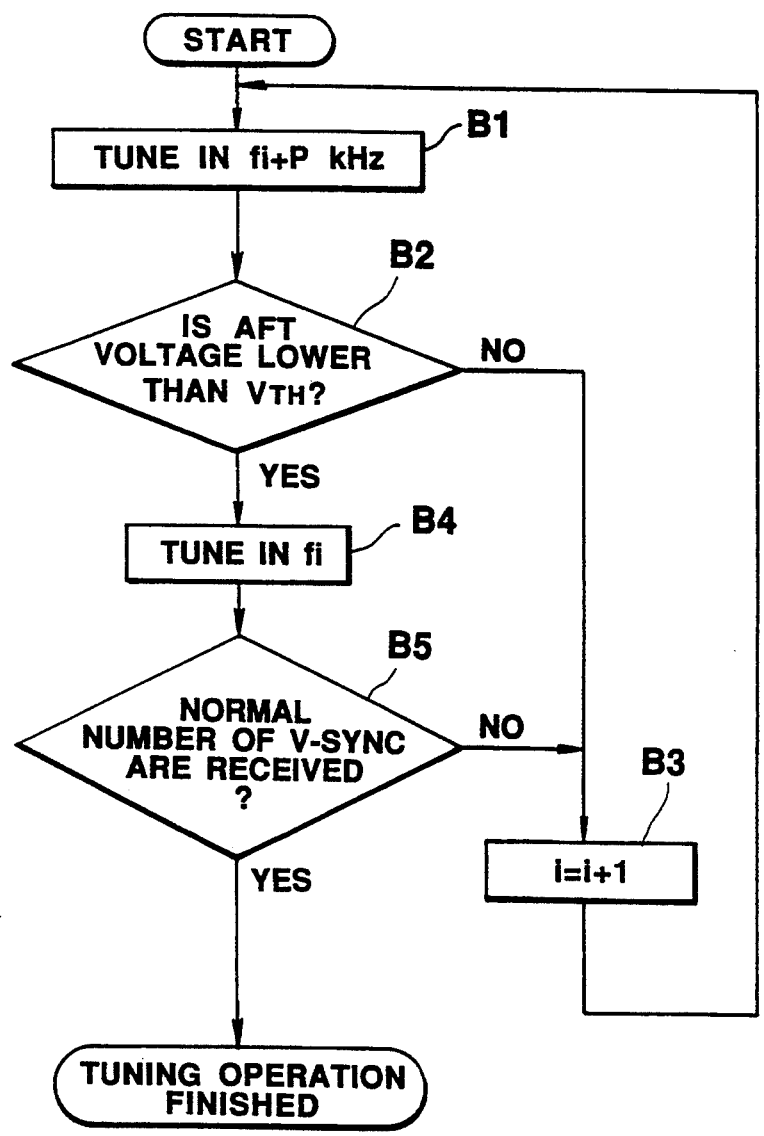
FIG. 7 is a flow chart of another auto-tuning process of the first embodiment.

FIG. 7 is a flow chart of the above auto-tuning operation. Processes at steps B1–B4 are similar to those of FIG. 6. In the flow chart of FIG. 7, a process of step B5 is added after the process of step B4 of FIG. 6. More specifically, after the central frequency Fi of the television signal wave has been tuned in at steps B1–B4, it is judged at step B5 whether a normal number of vertical sync signals are transferred from the sync-signal processor 38. For example, it is repeatedly judged for several times whether the normal number of vertical sync signals are received during a predetermined period. From the result of the judgement at step B5, it is evaluated how disturbed the indication on the display unit 12 will be. When it is judged at step B5 that the normal number of vertical sync signals are not transferred from the sync-signal processor 38, and the indication on the display unit 12 will be disturbed, the CPU 51 returns to step B3, where a next channel is selected, and then similar operation will be executed. When it is judged at step B5 that the normal number of vertical sync signals are transferred from the sync-signal processor 38 and the television channel will be received in a good condition, the auto-tuning operation is finished.

<List Displaying Operation and Auto-Preset Operation>

The list displaying operation at step A7 of FIG. 4 and the auto-preset operation at step A8 of FIG. 4 will be described with reference to a flow chart of FIG. 8. At step C1, a youngest channel number N is input to an i-register of the RAM 53. For example, a number "1" is input to the i-register, in Japan. An initial value "0" is input to a j-register of RAM 53 at step C2.

Television signal wave of the television channel "1" is tuned in in accordance with the value "1" registered in the i-register of the RAM 53 at step C4. When the television signal wave is received, the CPU 51 judges at step C4 from a voltage level of the AFT signal supplied from the video detector 34 whether a television signal is present at the television channel "1".

When the CPU 51 judges that a television signal is not present at the television channel "1", the CPU 51 goes to step C10, where the CPU 51 judges whether an oldest television channel M has not been registered to the i-register. In Japan, it is judged that a number "62" is not registered to the i-register at step C10. At the following step C11, the value of the i-register is incremented by "+1", and the operation returns to step C3. Thereafter, the processes beginning from step C3 will be repeatedly executed.

When it is judged at step C4 that a television signal is present at the television channel "1", the CPU 51 increments the value of the j-register by "+1" at step C5. To judge whether the signal receiving level of the television signal is ample, the CPU 51 judges at step C6 whether the signal receiving level of the television signal is higher than a predetermined level.

Whether signal receiving level is ample or not is decided depending on whether an automatic gain control (AGC) signal is higher than a predetermined threshold value. The AGC signal is output from an automatic gain control (AGC) circuit (not shown in FIG. 2) which is provided in the video detector 34 and which controls gain of a received television signal. Otherwise, it is decided depending on whether the counted number of the vertical sync signals reach the normal number.

When it is judged at step C6 that the signal receiving level is ample, a flag "1" is set to K-flag register in the RAM 53 at step C7. When it is judged at step C6 that the signal receiving level is not ample, a flag "0" is set to K-flag register in the RAM 53 at step C8.

A combination of a value of the i-register and a value of the K-flag register is stored in j-th area of a register within the RAM 53, which stores results of the searching operation (operation for searching for available television channels). The above J-th area of the register corresponds to a value of the j-register of the RAM 53.

The CPU 51 confirms at step C10 that the oldest television channel M has not been registered to the i-register, that is, for example, in Japan the number "62" has not been registered to the i-register, and the value of the i-register is incremented by "+1". Then, the operation returns to step C3.

Thereafter, the CPU 51 repeatedly executes the processes at steps C3 to C11, thereby updating the value of the i-register until the value of the i-register reaches the value M.

Figure 11:
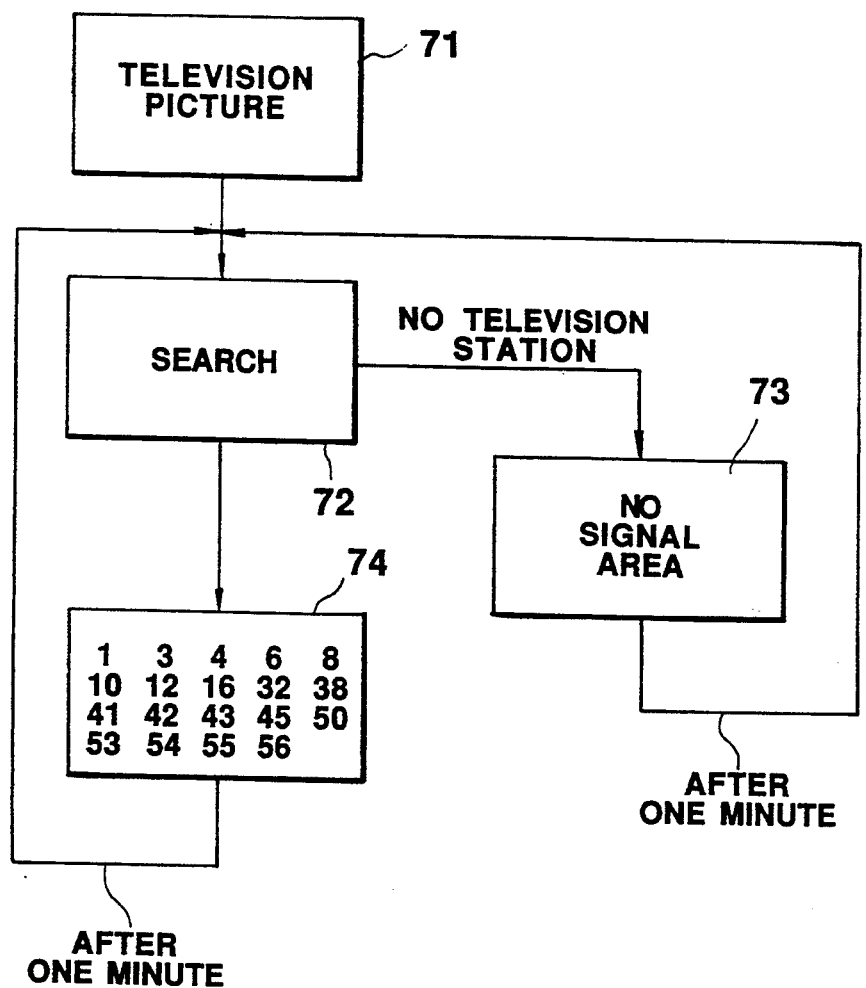
FIG. 11 is a view illustrating television indications displayed in the list displaying process of FIG. 8.

At the time when the process at step C1 is started, a television picture appearing on the display unit 12, shown at 71 in FIG. 11, is switched to an indication "SEARCH" (SEARCH indication 72), as shown at 72, indicating that the searching operation is being performed. The indication "SEARCH" is on the display unit 12 while the processes at steps C3 to C11 are repeatedly executed.

While the indication "SEARCH" is on the display unit 12, the control unit 39 outputs the audio control signal Vs of "0" level to the volume control circuit 41 thereby muting an audio output from the speaker 43, and the control unit 12 does not receive any key input operation signal KD from the key input unit 44.

When it is judged at step C10 that the oldest channel number M has been registered to the i-register, which means that the searching operation from the television channel N to the television channel M has been finished, j available television channel numbers (j stands for an integer) together with values of K which are representative of the signal receiving intensity are read out from the RAM 53, and display data of character codes for the list displaying operation are developed and transferred to the character generator 65.

The character generator 65 develops character data signals CD of dot pattern for the respective color signals R, G, B from the display data based on the vertical sync signals Vsync and the horizontal sync signals Hsync received from the sync signal processor 38. These character data signals CD are supplied to display driving circuit 36, which drives the display unit 12 at step C12 to display a list of available television channels (LIST indication 74) as shown at 74 in FIG. 11.

Channel numbers of available television signals may be displayed on the display unit 12 in different displaying states in association with the values of K representative of the signal receiving intensity, respectively. The channel numbers of available television signals of high signal receiving intensity and those of low signal receiving intensity may be displayed in different colors. Further, either of the channel numbers of available television signals of high signal receiving intensity or those of low signal receiving intensity may be displayed in a blinking manner. Furthermore, the channel numbers of available television signals of high signal receiving intensity and those of low signal receiving intensity may be displayed in different areas on the display unit 12, respectively.

When no available television channel has been detected as a result of the searching operation, an indication of "NO SIGNAL AREA" (NO SIGNAL AREA indication 73) is displayed on the display unit 12, as shown at 73 in FIG. 11.

After performing the above list displaying operation, the CPU 51 judges at step C13 whether the list displaying operation is performed by operation of the preset key 14 or by operation of the guide key 13.

When the list displaying operation is performed by operation of the guide key 13, then the operation is finished. When the list displaying operation is performed by operation of the preset key 14, j available television channel numbers (j stands for an integer) together with values of K which are representative of the signal receiving intensity are read out from the RAM 53, and are transferred to the memory unit 45 at step C14. Then, the operation is finished.

An example of the searching operation for searching from the television channel N to the television channel M has been described with reference to the flow chart of FIG. 8, but the searching operation may be repeatedly performed for several times. In this case, the LIST indication or the NO SIGNAL AREA indication, as shown at 74 and 73 in FIG. 11, is displayed on the display unit 12 for a predetermined period, for example for one minute, and then the searching operation will be performed again. Thereafter, these operations will be repeatedly performed for predetermined number of times.

When the searching operation is repeatedly performed for several times, the user can easily learn the available television channels while he drives a car. By using the searching operation when he can not tune in his desired television channel, he can learn the time when the desired television channel will be received.

<Intro-Scan Operation>

Figure 9:
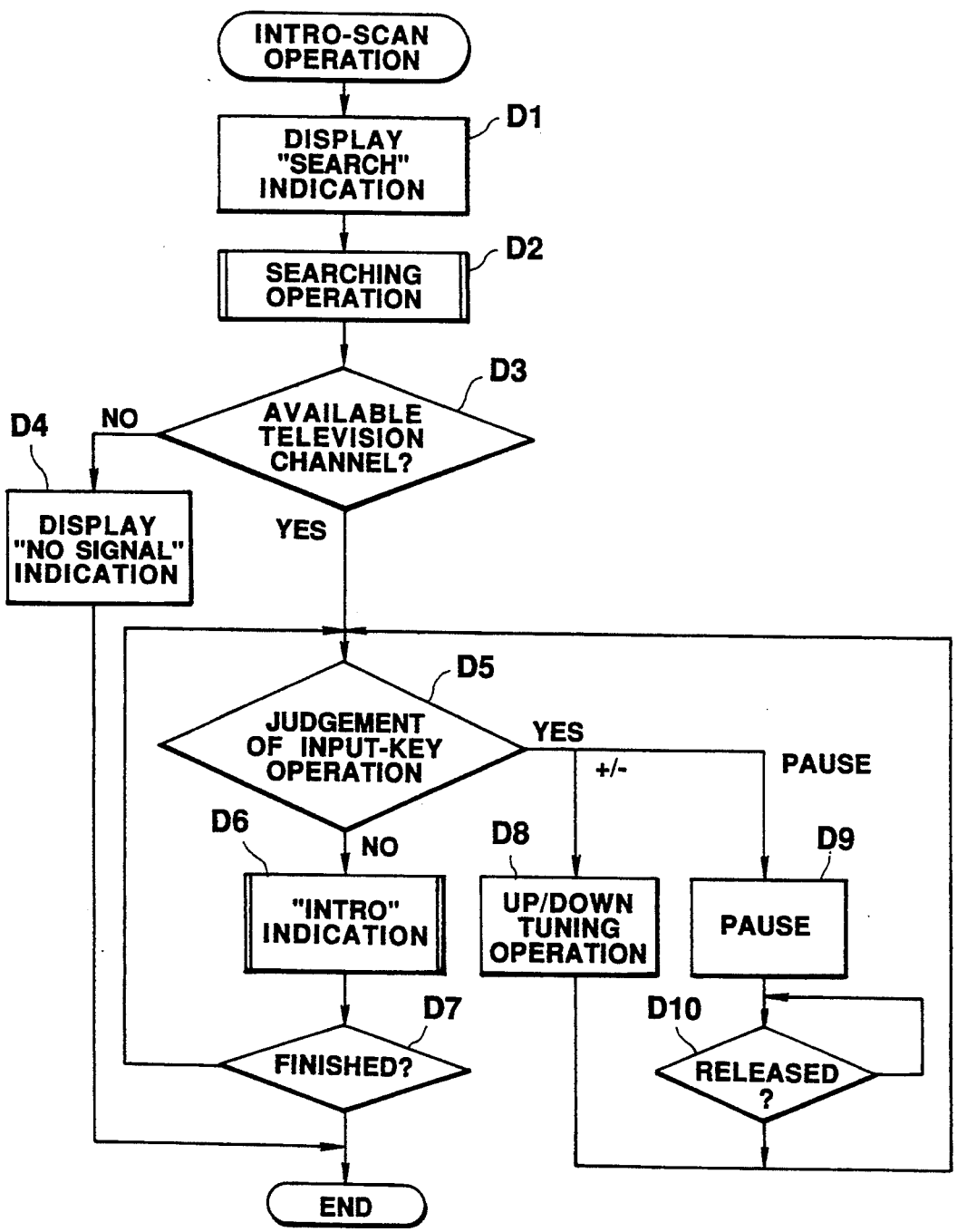
FIG. 9 is a flow chart of an intro-scan process of FIG. 4.
Figure 10:
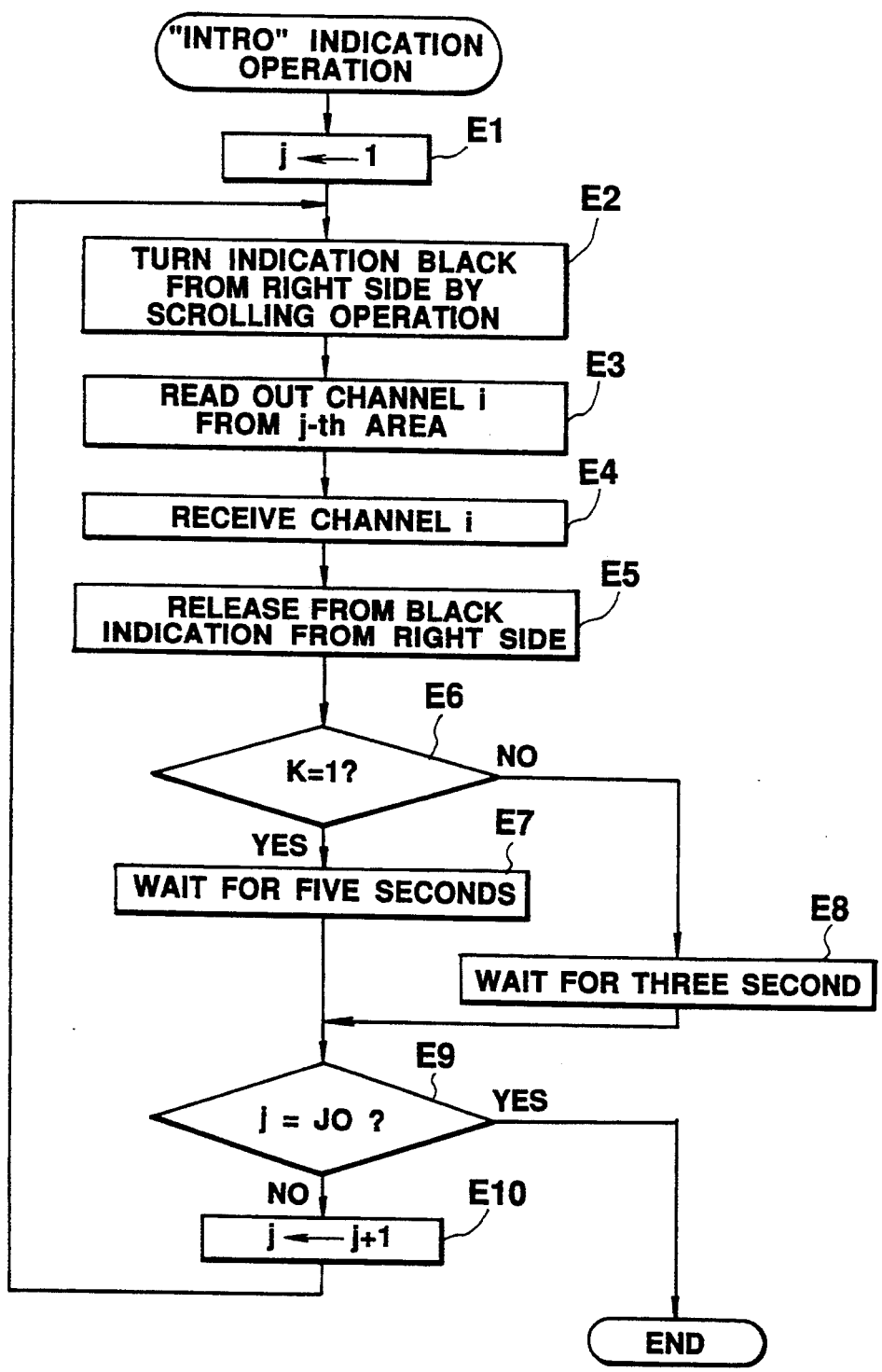
FIG. 10 is a flow chart of an intro-indication displaying process of FIG. 9.
Figure 12:
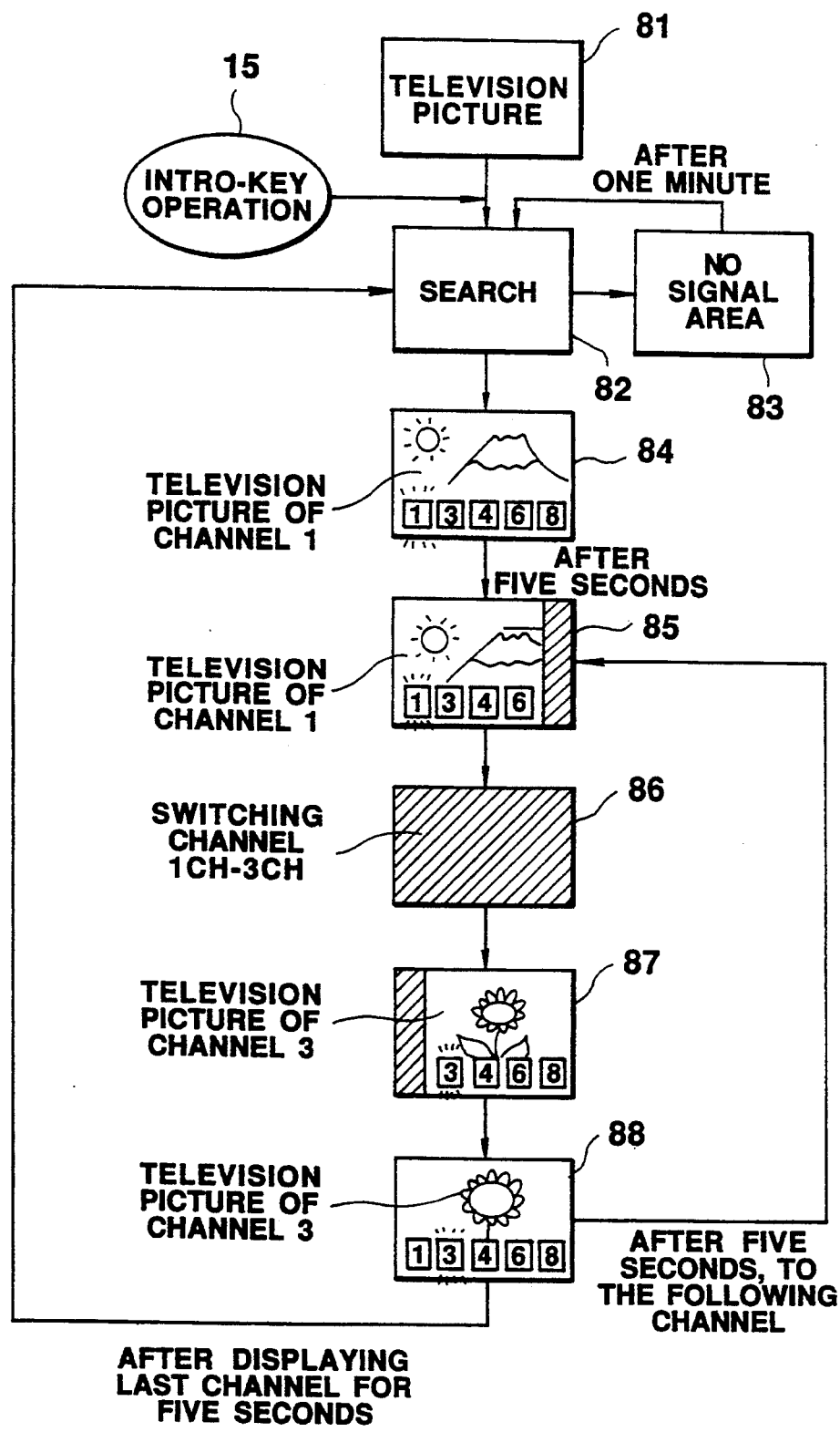
FIG. 12 is a view illustrating television indications displayed in the intro-indication displaying process of FIG. 10.

FIGS. 9 and 10 are flow charts of the intro-scan operation. FIG. 12 is a view illustrating indications displayed on the display unit 12 while the intro-scan operation is being performed.

When the intro-key 15 is operated while a normal television picture 81 is displayed on the display unit 12 as shown at 81 in FIG. 12, the intro-scan operation of FIG. 9 is started. At step D1 of FIG. 9, a SEARCH indication 82 is displayed on the display unit 12. At the following step D2, the searching operation for automatically tuning available television channels is performed. During the searching operation, the processes of steps C1 to C11 of FIG. 8 will be executed, and a further description thereof is omitted. The total number of television channels which are judged as available television channels (television channels which can be received) is stored in the J0-register of the RAM 53.

After performing the searching operation, the CPU 51 judges at step D3 whether any television channel number has been stored in the RAM 53 in order to decide on whether an available television channel is present. When it is decided that no available television channel is present, the CPU 51 make at step D4 the NO SIGNAL AREA indication 83 to be displayed on the display unit 12, as shown in FIG. 12. Now, the intro-scan operation is finished.

When it is decided that an available television channel is present, the CPU 51 waits for an key input operation only for a predetermined period at step D5. When the CPU 51 receives no key input operation, the CPU 51 performs an intro-display process shown in FIG. 10 for one time at step D6.

An initial value "1" is set to the j-register of the RAM 53 at step E1 of FIG. 10. The CPU 51 successively scrolls at step E2 the indication on the display unit 12 from the right side to make it black depending on a black image signal supplied from the character generator 65. In accordance with the value of the j-register, the CPU 51 reads out j-th television channel number i together with the value of K representative of the signal receiving intensity from the RAM 53 at step E3.

At step E4, the CPU 51 makes the tuner 32 tune in a television signal wave of the television channel i in accordance with the read out television channel i. At the following step E5, the CPU 51 successively scrolls the black indication on the display unit 12 from the right side to release it from black indication. When the indication on the display unit 12 has been completely released from the black indication, for example, a television picture 84 of the television channel 1 is displayed at first, as shown in FIG. 12.

The CPU 51 reads out other television channel numbers form the memory area of the RAM 53, and displays all of the available television channels at a lower portion of the indication on the display unit 12, as shown at 84 in FIG. 12. Only the television channel number which was read out from the RAM 53 at step E3 is displayed, for example, in a blinking manner or in a different color from other television channels, to indicate that the present television picture corresponds to the television channel number displayed thus.

When the whole television picture 84 has been displayed, the CPU 51 judges at step E6 whether the value of K representing the signal receiving intensity, which value of K was read out at step E3, is "1", that is, the CPU 51 judges whether a signal receiving level of the television signal corresponding to the television channel number read out at step E3 is high enough.

When the value of K is "1", it is judged that the signal receiving level of the television channel is high enough, whose the television picture 84 is now on display on the display unit 12. Then, the television picture 84 is displayed for a predetermined period, for example, for five seconds at step E7.

When the value of K is "0", it is judged that the signal receiving level of the television channel is low, the television picture 84 of which channel is now on display on the display unit 12. Then, the television picture 84 is displayed for a predetermined period, which is apparently shorter than the above predetermined period, for example, for three seconds at step E8.

After 3 or 5 seconds have lapsed, the CPU 51 judges at step E9 whether the value of the j-register is equivalent to the value which is stored in the J0-register of RAM 53 when the searching operation was performed at step D2. When the value of the j-register is not equivalent to the value stored in the j-register of RAM 53, the CPU 51 confirms at step E9 that the television channel, the television signal of which is on display on the display unit 12, is not the oldest available television channel obtained by the searching operation. Then, the CPU 51 increments the value of the j-register by +1 at step E10.

Similarly, the processes of steps E2 to E10 are repeatedly executed and the value of the j-register is incremented accordingly until the value of the j-register reached the value of the J0-register. Meanwhile, the television pictures 85 to 88 of the available television channels are successively switched by scrolling black indication and are displayed on the display unit 12 respectively for predetermined periods depending on the signal receiving intensity.

When the television picture of the oldest available television channel is displayed, and the CPU 51 judges at step E10 that the value of the j-register reaches the value of the J0-register, the operation is finished.

The intro-display process is performed at step D6 of FIG. 9 in accordance with the flow chart of FIG. 10, and the CPU 51 judges at step D7 whether the intro-display process is finished. When the intro-display process is not finished, the operation returns to step DS, where the CPU 51 waits for the key input operation. When the key input operation is not received, the processes of steps D5 to D7 are repeatedly executed until it is judged at step D7 that the intro-display process is finished. When it is judged at step D6 that the intro-display process is finished, the intro-scan operation of FIG. 9 is finished.

When either of the "+" key of the channel key 17 or the "−" key is operated during the into-display process, the CPU 51 judges the key operation at step D5, and executes at step D8 the up tuning operation or the down tuning operation from the television channel displayed on the display unit 12 depending on the operated key. Thereafter, the operation returns to step DS, where the CPU 51 waits for the key input operation.

When the pause key 16 is operated during the intro-display process, the CPU 51 judges the key operation at step DS, and the CPU 51 keeps resetting a counter of indicating a time at step E7 of the intro-display process FIG. 10 or at step E8, thereby temporarily stopping the intro-display process and displaying the television picture of the television channel which is tuned in at that time at step D9. Thereafter, at step D10, the CPU 51 waits for another operation of the pause key 16 which will start the intro-display process again. When the pause key 16 is operated again, the CPU 51 returns to step D5 to wait for the key input operation.

An example is shown in FIGS. 9 and 10, in which the searched available television channels are displayed for one time in the intro-display process. The intro-display process may be repeatedly executed for displaying the available television channels for several times. In this case, the television picture 88 of the last available television channel is displayed for a time duration corresponding to the signal receiving intensity, for example, for five minutes or three minutes, and then the operation returns to the SEARCH indication 82. Thereafter, the intro-display process is repeatedly executed for a predetermined number of times.

When the intro-display process is repeatedly executed for several times, the user can watch all of the television pictures of the available television channels. Reviewing the television pictures of the available television channels which are successively displayed on the display unit 12 during the intro-display process, the user can select his desired television channel by operating the pause key 16 or the channel key 17 when a television picture of a certain television channel or of a near television channel is displayed on the display unit 12.

Now, the intro-scan operation has been finished.

<Network Displaying Operation>

Figure 13:
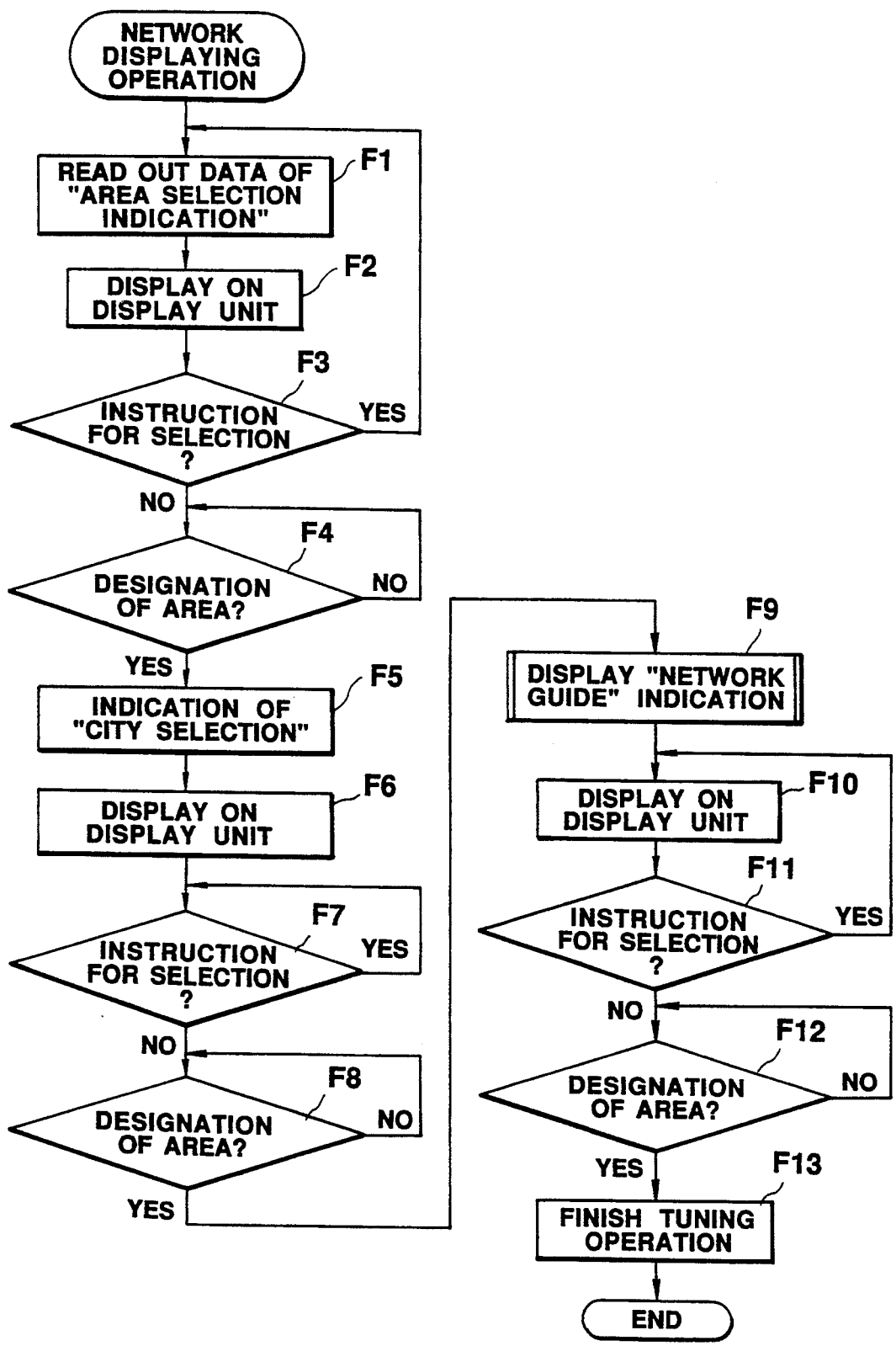
FIG. 13 is a flow chart of a network displaying process of FIG. 4.

FIG. 13 is a flow chart of the detailed network displaying operation. At step F1, display data for displaying an area selection indication is read out, and the character data of the display data is developed by the character generator 65 and is displayed on the display unit 12 at step F2.

More specifically, display data of the area selection indication are previously stored in the ROM 52 of the control unit 39. The area selection data indicates local maps such as those of "Hokkaido", "Tohoku", "Kanto", "Kyushu" and so on (all of which are local areas in Japan).

Figure 14A:
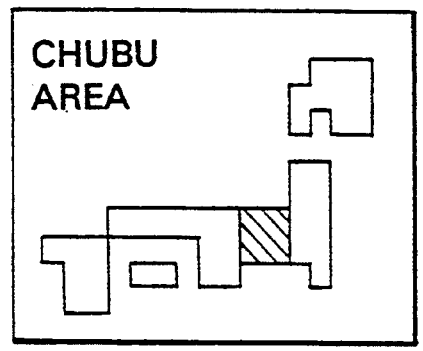
FIGS. 14(A), 14(B) and 14(C) are views illustrating television indications displayed in the network displaying process of FIG. 13.
Figure 14B:
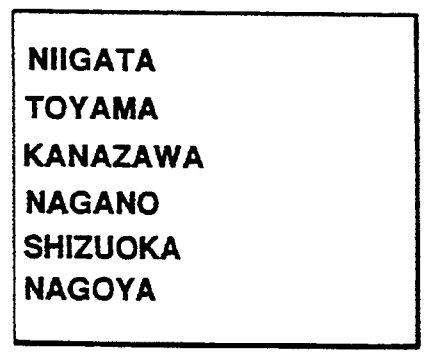
Figure 14C:
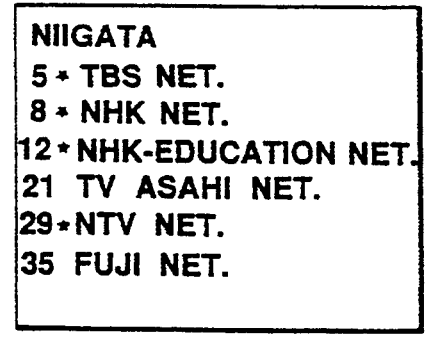

FIG. 14 (A) is a view showing an area selection indication indicating "Chubu area" (a central area of Japan) of Japan.

On the area selection indication of Chubu area of FIG. 14(A), there is illustrated a schematic map of all of areas of Japan of a dot pattern together with characters "CHUBU", and only the "Chubu area" is illustrated in color (a hatched portion in FIG. 14 (A)).

The CPU 51 waits for a key input operation while the above area selection indication is on the display unit 12. When a key is operated, it is judged at step F3 whether either of the "+" key of the channel key 17 or the "−" key for instructing selection of an area is operated.

When it is judged that the key for instructing selection of an area is operated, the processes from step F1 and the following steps are executed to make an area selection indication of another area in accordance with the direction designated by either the "+" key or the "−" key.

When, for example, the "+" key of the channel key 17 is operated while the area selection indication of "Chubu area" is displayed, the area selection indication is switched to that of "Kansai area" while, when the "−" key is operated, the area selection indication is switched to that of "Kanto area".

When the processes of steps F1 to F3 are repeatedly executed and a key other than the "+" key and the "−"

key of the channel key 17 is operated while the area selection indication of the area desired by the user is displayed on the display unit 12, the CPU 51 judges the operation of the above key at step F3. That is, the CPU 51 judges at step F4 whether the key is operated for instructing of designation of the area on the display unit 12, for example, whether the pause key 16 is operated.

The CPU D1 does not accept operation of a key other than the pause key 16, and keeps waiting for operation of the pause key 16. When the pause key 16 is operated, the CPU 51 reads out display data of an city selection indication for selecting a city at step FS, and makes the character generator 65 to develop the relevant character data, thereby displaying the city selection indication on the display unit 12 at step F6.

In the ROM 52 of the control unit 39, display data of an city selection indication which displays cities belonging to the area corresponding to the area selection indication is previously stored.

FIG. 14 (B) is a view showing the city selection indication corresponding to the area selection indication of "Chubu area" of FIG. 14 (A). In FIG. 14 (B), cities belonging to "Chubu area" are displayed such as "Niigata", "Toyama", "Kanazawa", "Nagano", "Shizuoka", "Nagoya" and so on. One of the cities, for example, "Niigata" is distinguishably displayed in a color different from those of other cities.

The CPU 51 waits for an key input operation while the city selection indication is on the display unit 12. When a key is operated, the CPU 51 judges at step F7 whether either of the "+" key of the channel key 17 or the "−" key is operated for instructing selection of a city.

When it is judged that the channel key 17 for instructing selection of a city is operated, the processes from step F6 and the following steps are executed to display in color another city of the cities on the city selection indication in accordance with the direction designated by either the "+" key or the "−" key.

More specifically, when, for example, the "+" key of the channel key 17 is operated while "Niigata" on the city selection indication of "Chubu area" shown in FIG. 14 (B) is displayed in a different color from those of other cities, "Toyama" is displayed in color. When the "−" key of the channel key 17 is operated, "Nagoya" is distinguishably displayed in color.

When the processes of steps F6 and F7 are repeatedly executed and a key other than the "+" key and the "−" key of the channel key 17 is operated while the desired city is displayed by operation of the key for instructing selection of a city, the CPU 51 judges the operation of the above key at step F7. That is, the CPU 51 judges at step F8 whether the key is operated for instructing of designation of the city on the display unit 12, for example, whether the pause key 16 is operated.

In this case, the CPU 51 does not accept a key input operation of a key other than the pause key 16, the auto key 20 and the area key 21. When the auto key 20 or the area key 21 is operated, the CPU 51 starts a receiving operation (not shown). When the pause key 16 is operated, the CPU 51 reads out display data of the next network guide indication at step F9, and makes the character generator 65 to generate the relevant character data, thereby displaying the network guide indication on the display unit 12 at step F10.

More specifically, in the ROM 52 of the control unit 39, the display data of a network guide indication corresponding to the city selection indication is previously stored, which network guide indication indicates channel numbers of television stations in the city and key stations of the respective television stations.

FIG. 14 (C) is a view showing the network guide indication corresponding to "Niigata" which is displayed in color, shown in FIG. 14 (B). In the network guide indication of "Niigata", there are indicated "(Channel) 5—TBS NET. (television network)", "(Channel) 8—NHK NET. (television network)", "(Channel) 12—NHK-Education NET. (television network)", "(Channel) 21—TV-Asahi NET. (television network)", "(Channel) 29—NTV NET. (television network)" and "(Channel) 35—Fuji NET. (television network)", as shown in FIG. 14 (C). Characters of "Channel 5—TBS NET. (television network)" are displayed in a color different from those of other television networks".

Figure 8:
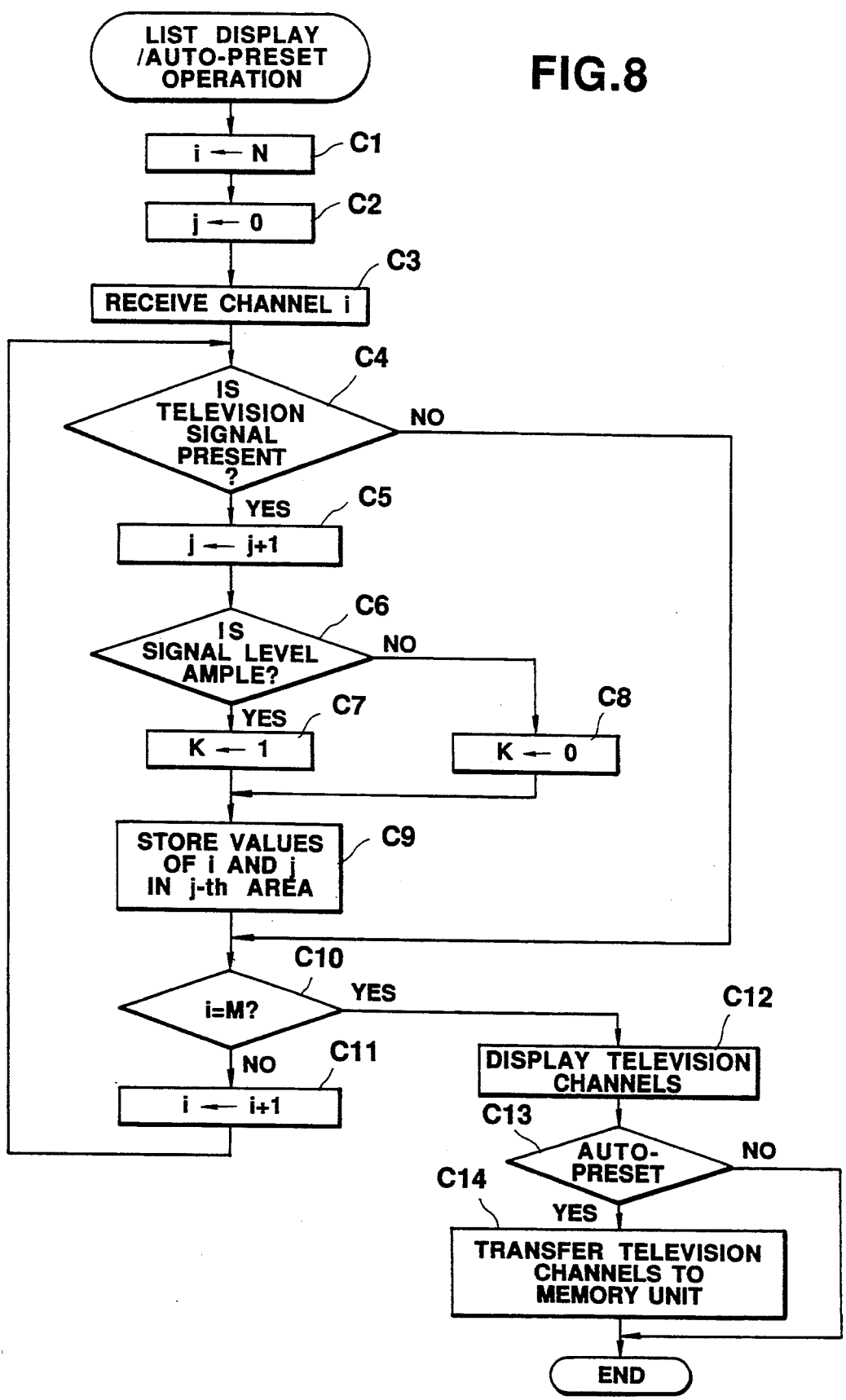
FIG. 8 is a flow chart of a list displaying process and an auto-preset process.

To display the network guide indication, a similar searching operation to that of steps C1 to C11 of FIG. 8 is performed, and thereby signal receiving intensity of respective television stations displayed on the network guide indication is detected. The detected signal receiving intensity is stored in the RAM 53. Depending on the stored signal receiving intensity, only the television channels of high level signal receiving intensity are marked, for example, with "star marks" respectively.

The CPU 51 waits for another key input operation while the network guide indication in on the display unit 12. When a key is operated, the CPU 51 judges at step F11 whether either of the "+" key of the channel key 17 or the "−" key is operated for instructing of selection of a television station.

When it is judged that the channel key 17 for instructing selection of a television station has been operated, the processes from step F10 and the following steps are executed to display in color another television station of the television stations on the network guide indication in accordance with the direction designated by either the "+" key or the "−" key.

When, for example, the "+" key of the channel key 17 is operated while the network guide indication of "Niigata" is displayed as shown in FIG. 14 (C), and the characters "5—TBS NET." are displayed in a different color from those of other television stations, "8—NHK NET." is displayed in color. When the "−" key of the channel key 17 is operated, characters "35—Fuji NET." are distinguishably displayed in color.

When the processes of steps F10 and F11 are repeatedly executed and a key other than the "+" key and the "−" key of the channel key 17 is operated while the desired television station is displayed by operation of the key for instructing selection of a city, the CPU 51 judges the operation of the above key at step F7. That is, the CPU 51 judges at step F12 whether the key is operated for instructing of designation of the television station on the display unit 12, for example, whether the pause key 16 has been operated.

In this case, the CPU 51 does not accept a key input operation of a key other than the pause key 16, the CPU 51 waits for a key input operation until the pause key 16 is operated. When the pause key 16 is operated, the CPU 51 sends the tuning signal TS to the tuner 32 depending on data of the designated television station. A receiving operation of the television signal of the designated television station is performed at step F13.

An example has been described, in which the television channel numbers in respective cities and the key stations of the relevant television networks are indicated on the network guide indication as shown in FIG. 14 (C). On the contrary, it may be previously memorized in the memory unit 45, to which television station in respective areas each key station corresponds.

FIG. 15 is a view exemplarily illustrating a network guide indication, which indicates which television stations of "Niigata" the respective key stations correspond to. With the network guide indication displayed on the display unit 12, whether the user lives in a large city or in a local area, he will be able to select easily his desired television channel even at his unfamiliar place.

In the above mentioned first embodiment, a method of detecting a signal level of an automatic fine tuning (AFT) signal obtained by the AFT detection, and a method of counting the number of pulses of the vertical sync signal in a predetermined period and comparing them with the normal pulse number have been described as the method of determining signal receiving intensity of the respective television stations. In addition to the above methods, a method may be considered of repeatedly executing a tuning operation of a television signal for several times and determining the signal receiving intensity of the television signal depending on how many times the television signal has been received during the tuning operation. The method will be described with reference to FIG. 16.

Figure 16:
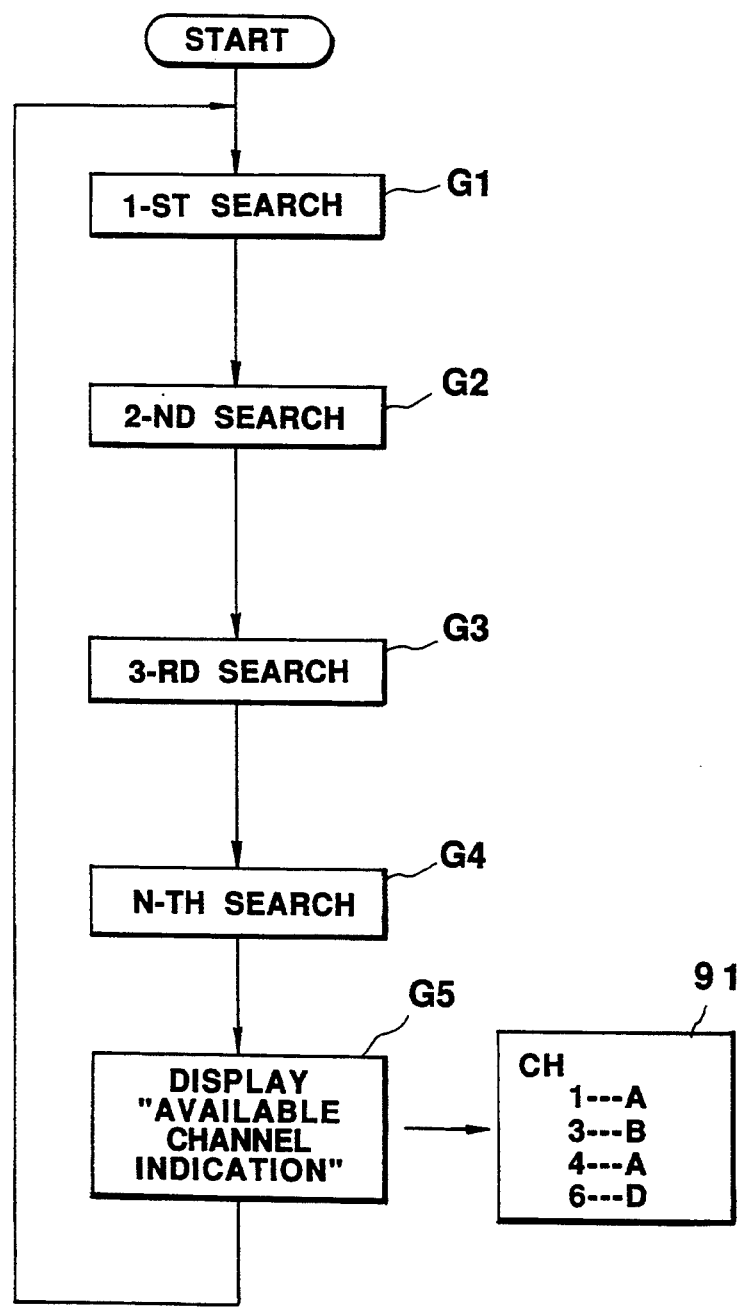
FIG. 16 is a view showing methods of detecting a signal receiving level and displaying thereof.

In FIG. 16, the auto searching operation of Steps C1 to C11 of FIG. 8 is repeatedly executed for n times at steps G1 to G4. The channel numbers of the television signals which have been received during the auto searching operation, and the number of times when the respective television signals have been received are stored in the RAM 53. These channel numbers and the number of times the television signal have been received are read out from the RAM 53, and are displayed on the display unit 12 (an available television channel indication) at step G5, as shown at 91 of FIG. 16.

The available television channel indication 91 indicates the television channels 1, 3, 4 and 6 as the available television channels, i.e., indicates that the television signals of the television channels 1, 3, 4 and 6 can be received, and further indicates the signal receiving intensity of the respective television channels in five ranges such as "A", "B", . . . "E".

The reference "A" stands for the signal receiving intensity of the television signal which has been received for n times when the auto searching operation has been repeatedly executed for n times. The reference "E" is given the signal receiving intensity of the television signal which has been received only once even though the auto searching operation has been repeatedly executed for n times. The user can learn a television channel of high signal receiving intensity for selecting a television channel.

A description of the first embodiment, which receives a television signal, has been given, but the description may be applicable to an embodiment, which receives a radio broadcasting signal.

<Second Embodiment>

A second embodiment of the present invention applied to a liquid crystal display television receiver will be described referring to the accompanying drawings.

Figure 17:
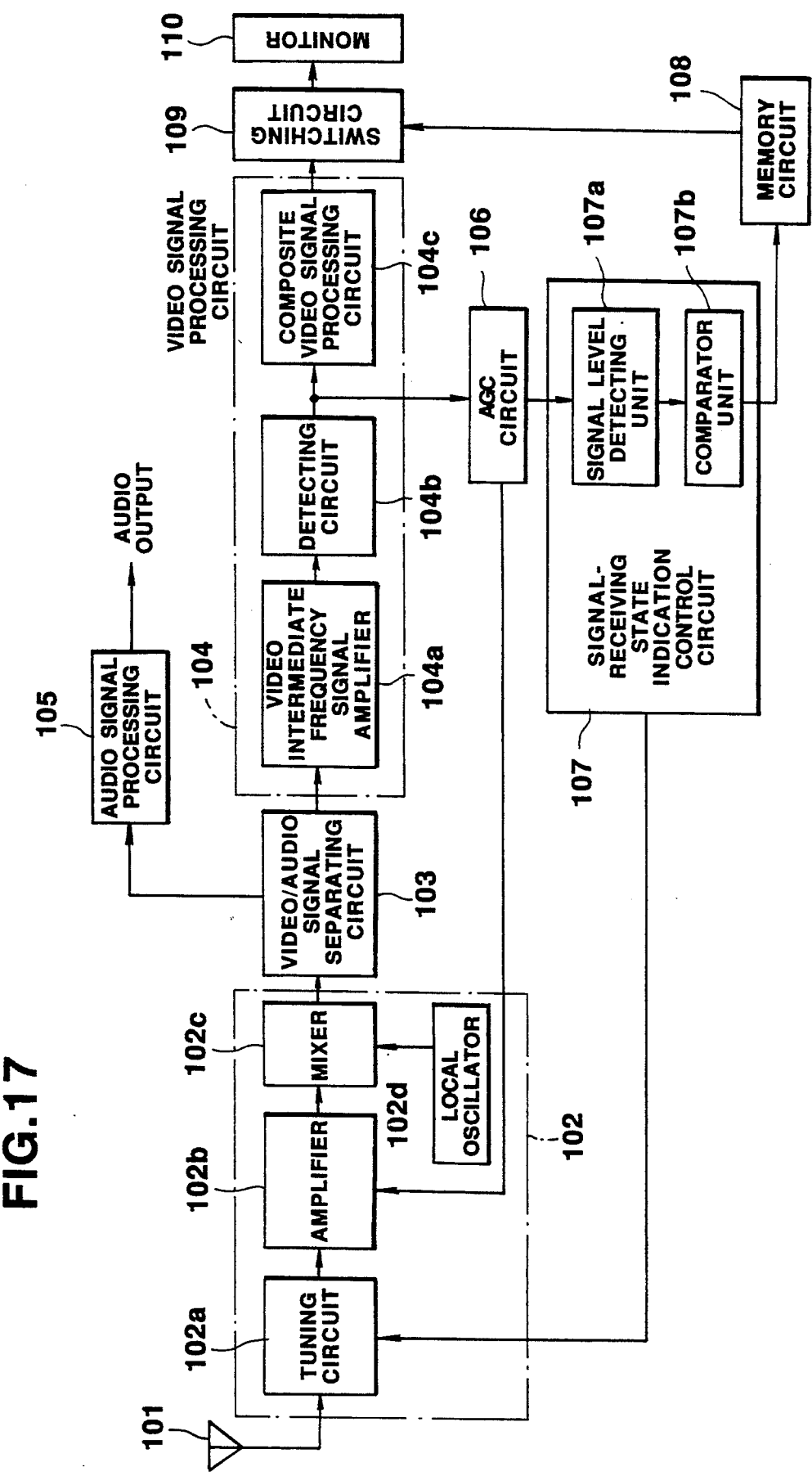
FIG. 17 is a circuit diagram of whole structure of a second embodiment.

FIG. 17 is a circuit diagram of the second embodiment. In FIG. 17, a television electric wave is transmitted through an antenna 101 to a tuner 102. The tuner 102 includes a tuning circuit 102a, an amplifier 102b, a mixer 102c and a local oscillator 102d. The television signal electric wave is input through the antenna 101 to the tuning circuit 102a. The tuning circuit 102a selects a designated channel of a high frequency signal from the television signal electric wave, on which multiple channels of high frequencies are superposed, depending on a tuning bias signal supplied from a signal-receiving state indication control circuit 107 to be describe later, and the tuning circuit 102a sends the selected channel of a high frequency signal to the amplifier 102b. The amplifier 102b amplifies the selected channel of a high frequency signal at a gain that is determined in accordance with an automatic gain control (AGC) signal supplied from an automatic gain control (AGC) circuit 106 to be described later, and provides the amplified high frequency signal as a signal of a constant voltage level to the mixer 102c. The mixer 102c mixes the supplied high frequency signal with the local oscillation signal input from the local oscillator 102d to obtain an intermediate frequency signal, and supplies the intermediate frequency signal to a video/audio signal separating circuit 103.

The video/audio signal separating circuit 103 separates the intermediate frequency signal into an audio intermediate frequency signal and a video intermediate frequency signal, and supplies the audio intermediate frequency signal and the video intermediate frequency signal to an audio signal processing circuit 105 and a video intermediate frequency signal processing circuit 104, respectively.

The audio signal processing circuit 105 amplifies the audio intermediate frequency signal, and performs an FM demodulation on the amplified audio intermediate frequency signal to obtain an original audio signal. The original audio signal is audibly output through a speaker (not shown).

The above video intermediate frequency signal processing circuit 104 includes a video intermediate frequency signal amplifier 104a, a detecting circuit 104b and a composite video signal processing circuit 104c. The video intermediate frequency signal is supplied from the audio/video signal separating circuit 103 to the video intermediate frequency signal amplifier 104a. The video intermediate frequency signal amplifier 104a amplifies the supplied video intermediate frequency signal at an appropriate gain and supplies the same to the detecting circuit 104b.

The detecting circuit 104b performs a video demodulation on the video intermediate frequency signal to obtain a composite video signal, and supplies the composite video signal to the composite video signal processing circuit 104c and an AGC circuit 106, which is externally connected to the video signal processing circuit 104.

The composite video signal processing circuit 104c subjects the composite video signal to a luminance signal process, a color signal process and a sync signal process to obtain a video signal including R, G and B color signals. The video signal is supplied to a switching circuit 109.

The AGC circuit 106 develops an AGC signal from the composite video signal transferred from the detecting circuit 104b. The AGC signal is supplied to the amplifier 102b to keep the gain of the received high frequency signal. The AGC signal is further supplied to the signal-receiving state indication control circuit 107.

The signal-receiving state indication control circuit 107 has a signal level detecting unit 107a and a comparator unit 107b. The AGC signal of the AGC circuit 106 is input to the signal level detecting unit 107a. The signal level detecting unit 107a detects a signal level of the AGC signal to determine a signal receiving level of a high frequency signal of a television channel which is tuned in, and supplies the detected signal level to the comparator unit 107b. The comparator unit 107b compares the received signal level with a predetermined reference level, and outputs the resultant signal as a video signal to a memory circuit 108.

The memory circuit 108 successively memorizes the video signal supplied from the comparator unit 107b of the signal-receiving state indication control circuit 107. The memory unit 108 serves to store the resultant video signals, each of which indicates whether a signal of each television channel has been received in good receiving state. The contents of the memory circuit 108 are transferred to the switching circuit 109.

The switching circuit 109 selectively supplies a monitor 110 with either of the video signal of the television broadcasting signal input from the composite video signal processing circuit 104c of the above video signal processing circuit 104 or the video signal representing the signal receiving state supplied from the memory circuit 108, under control of a control circuit (not shown). The monitor 110 displays the video signal supplied through the switching circuit 109.

Now, operation of the second embodiment will be described.

A television signal wave is received by the antenna 101 and supplied to the tuning circuit 102a of the tuner 102. The tuning circuit 102a selects a high frequency television signal of a designated television channel in accordance with the tuning bias signal sent from the signal receiving state indication control circuit 107. The selected high frequency television signal is amplified to a certain signal level by the amplifier 102b, and supplied to the mixer 102c. The mixer 102c mixes the supplied high frequency television signal with the local oscillation signal of the local oscillator 102d, thereby obtaining an intermediate frequency signal. The intermediate frequency signal is supplied to the video/audio signal separating circuit 103.

The video/audio signal separating circuit 103 separates the intermediate frequency signal into an audio intermediate frequency signal and a video intermediate frequency signal, and supplies the audio intermediate frequency signal and the video intermediate frequency signal to an audio signal processing circuit 105 and a video intermediate frequency signal processing circuit 104, respectively.

The audio signal processing circuit 105 obtains an original audio signal, and audibly outputs the audio signal through the speaker (not shown).

In the above video intermediate frequency signal processing circuit 104, the video intermediate frequency signal amplifier 104a amplifies the supplied video intermediate frequency signal and supplies the same to the detecting circuit 104b, and the detecting circuit 104b detects a composite video signal which includes a luminance signal, a carrier chrominance signal and sync signal, and supplies the composite video signal to the composite video signal processing circuit 104c and an AGC circuit 106, which is externally connected to the video signal processing circuit 104. The composite video signal processing circuit 104c subjects the composite video signal to a luminance signal process, a color signal process and a sync signal process to obtain a video signal, and supplies the video signal to the switching circuit 109.

The AGC circuit 106 develops an AGC signal from the composite video signal transferred from the detecting circuit 104b. The AGC signal is used to keep the gain of the signal levels of the video and audio signals. The AGC signal is supplied to the amplifier 102b and the signal level detecting unit 107a of the signal-receiving state indication control circuit 107.

The signal level detecting unit 107a detects a signal level of the AGC signal, and supplies the detected signal level to the comparator unit 107b.

Figure 18:
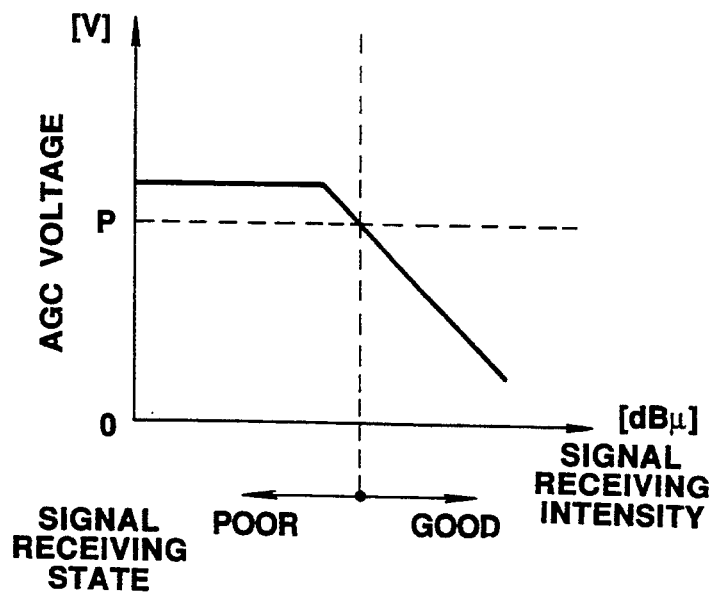
FIG. 18 is a view showing relationship between a receiving electric field and an AGC signal voltage in the second embodiment.

FIG. 18 is a view showing a relationship between an electric field of a television signal wave and the signal level of the AGC signal. As shown in FIG. 18, as a signal level of a television signal wave raises and the electric field intensity increases accordingly, the signal level of the AGC signal decreases, which apparently means that, if the electric field intensity increases (a signal can be received in good condition), a certain level of signal can be obtained by the amplifier 102b with a low gain. Assuming that an AGC voltage P is a critical point of video quality, that is, if the AGC voltage raises higher than this critical point P, a television picture to be displayed on the display unit 12 is poor, and on the contrary, if the AGC voltage is lower than the critical point P, the television picture is displayed in good condition, and the critical point P is set as a reference voltage to the comparator unit 107b, then the signal-receiving state indication control circuit 107 can judge by comparing the signal level of the AGC signal with the critical point P, whether or not a television signal will be received in good condition.

Figure 20:
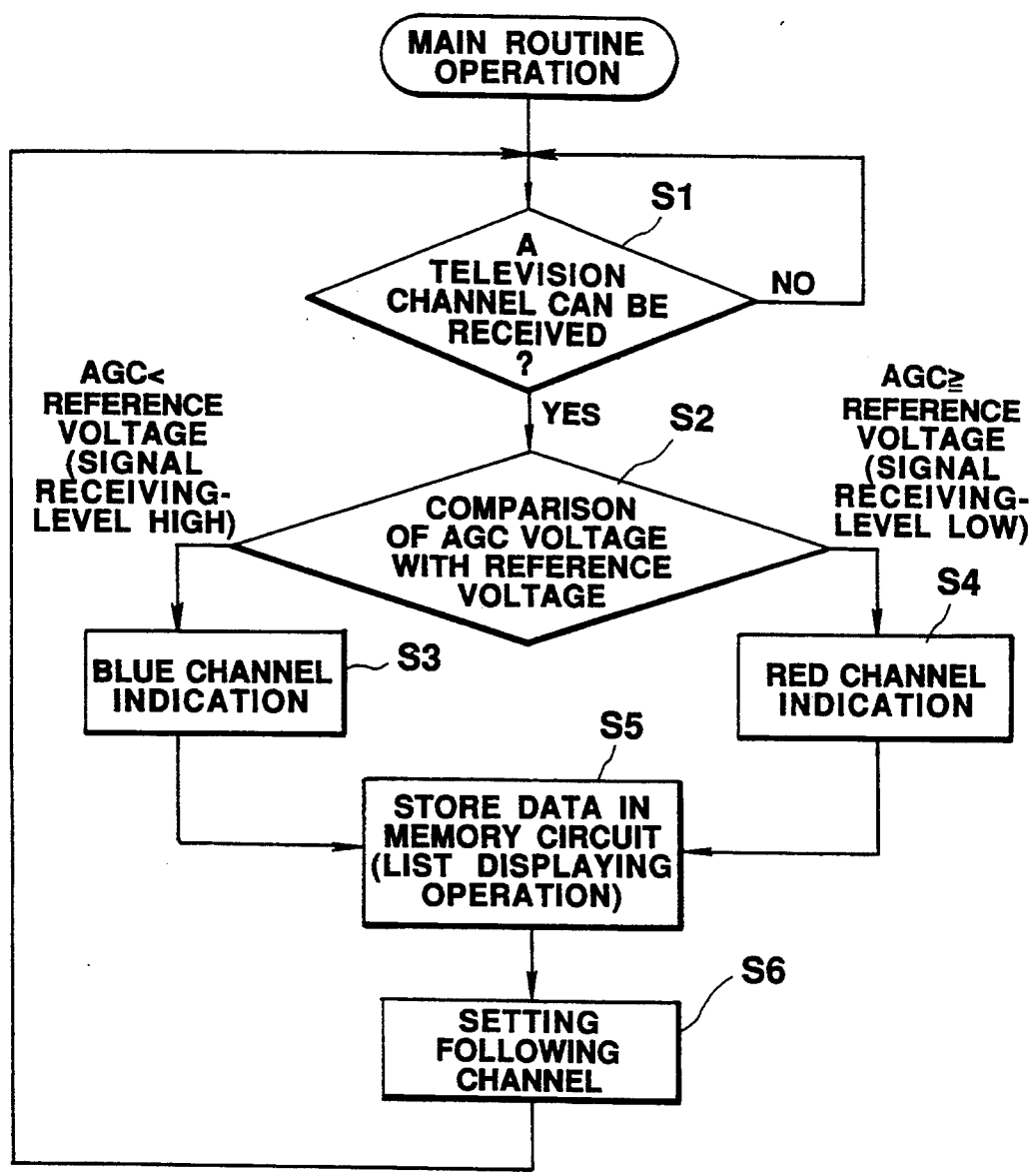
FIG. 20 is a flow chart of a process for controlling an indication of a receiving state in the second embodiment.

FIG. 20 is a flow chart of a process of detecting a signal receiving intensity of a television channel. At step S1, it is judged whether a television signal wave of a designated television channel is present in order to determine whether the television signal of the television channel can be received. When the television signal can be received, the signal level detecting unit 107a detects the signal level of the AGC signal of the AGC circuit 106 at the time. The comparator unit 107b compares the detected signal level with the predetermined critical point P (the reference voltage) at step S2.

When it is judged that the signal level of the AGC signal is lower than the reference voltage, it is determined that the television signal of the designated television channel will be received in good condition. According to the result of the judgement, both display data of the television channel number and display data of a blue color for monitoring to indicate that the television signal will be received in good condition are combined at step S3 and stored in the memory circuit 108 at step S5.

When it is judged that the signal level of the AGC signal is higher than the reference voltage, it is determined that the television signal of the designated television channel will not be received in good condition. According to the result of the judgement, both display data of the television channel number and display data of a red color for monitoring to indicate that the television signal will not be received in good condition are combined at step S4 and stored in the memory circuit 108 at step S5.

Thereafter, the following television channel, television signal of which is to be received, is set depending on the tuning bias signal which is supplied from the signal-receiving state indication control circuit 107 to tuning circuit 102a, and the processes of step S1 and the following steps are executed, again.

When the processes of steps S1 to S5 are repeatedly executed, and television channels are successively updated to be designated, signal receiving state of all of the available television channels are memorized in the memory circuit 108. The contents of the memory circuit 108 are read out and supplied as video signals to the switching circuit 109.

The switching circuit 109 selectively transfers the video signal of the memory circuit 108 to the monitor 110 under control of the control circuit (not shown). Then, a list of the available television channels is displayed on the monitor 110 in various colors depending on whether the relevant television channels can be received in good condition, as shown in FIG. 19.

Figure 19:
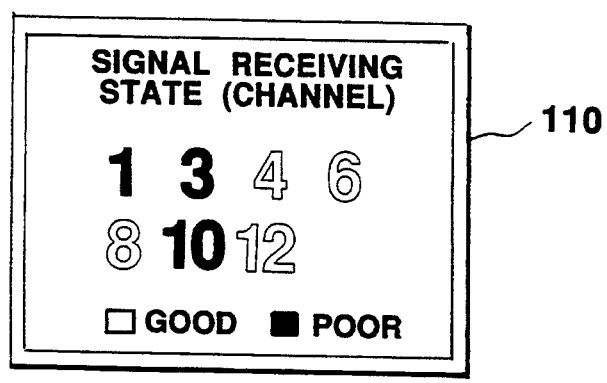
FIG. 19 is a view illustrating an indication of a list of available channels in the second embodiment.

The indication on the monitor 110 shown in FIG. 19 indicates that the available television channels are "1", "3", "4", "6", "8", "10" and "12", and particularly the television signals of the television channels "4", "6", "8" and "10" can be received in good condition.

In the above embodiment, the available television channel numbers are displayed in the order of the television channel number in various colors depending on whether the relevant television channels can be received in good condition. For example, either of the television channels which can be received in good condition or the television channels which can not be received in good condition may be displayed in blinking manner. Further, a display area on the monitor 110 may be divided into two areas: one for indicating the television channels which can be received in good condition and other for indicating the television channels which can not be received in good condition. Other various manners of indicating the television channels may be considered.

Several embodiments of the present invention have been described in detail but these embodiments are simply illustrative and not restrictive. The present invention may be modified in various manners. All the modifications and applications of the present invention will be within the scope and spirit of the invention, so that the scope of the present invention should be determined only by what is recited in the present appended claims and their equivalents.

What is claimed is:

1. A receiver comprising:
   searching means for performing an automatic tuning operation of television signal waves to search for a receivable television signal wave corresponding to an available television channel;
   storing means for storing the available television channel searched by said searching means;
   displaying means for indicating a list of the available television channels stored in said storing means;
   detecting means for detecting a signal receiving intensity of a television signal wave of the available television channel searched by said searching means; and wherein:
   said storing means stores the available television channels searched by said searching means together with the signal receiving intensity of the television signal waves of the corresponding available television channels detected by said detecting means;
   said searching means includes means for repeatedly performing an automatic tuning operation of television signal waves for several times to search for an available television channel; and
   said detecting means detects a signal receiving intensity of a television signal wave of the available television channel searched by said searching means depending on how many times the corresponding television signal wave has been tuned in by said searching means.

2. A receiver according to claim 1, wherein said displaying means includes means for displaying the list of the available television channels stored in said storing means and the signal receiving intensity of the associated television signal waves, as detected by said detecting means.

3. A receiver comprising:
   receiving means for receiving plural channels of television signals, said receiving means including:
      tuning means for tuning in channels of the plural channels of television signals; and
      control means for controlling said tuning means so as to successively tune in respective ones of said plural channels of television signals; and
   display means for successively displaying for predetermined periods of time, the respective plural channels of television signals received by said receiving means and tuned in by said tuning means under control of said control means.

4. A receiver according to claim 3, wherein said display means switches, by a scrolling operation, the plural channels of television signals received by said receiving means to successively display each of the television signal channels for a predetermined period of time.

5. A receiver according to claim 3, further comprising channel selecting means for compulsorily controlling said receiving means so as to receive plural channels of television signals in an order of television channels while said receiving means is in a receiving operation.

6. A receiver according to claim 3, further comprising pause means for controlling said receiving means to continue to receive a channel of television signals, while said receiving means is in a receiving operation.

7. A receiver according to claim 3, wherein said receiving means further includes searching means for performing an automatic fine tuning operation of television signal waves to search for an available and receivable television signal wave corresponding to a television channel.

8. A receiver according to claim 7, wherein said display means successively displays the television signals of the available television channels received by said receiving means together with an identification of the television channels.

9. A receiver according to claim 7, further comprising:
   detecting means for detecting a signal receiving intensity of a television signal wave of each available television channel searched by said searching means; and
   storing means for storing the available television channels searched by said searching means together with the signal receiving intensity of the corresponding available television channels detected by said detecting means.

10. A receiver according to claim 9, wherein said display means displays the available television channels stored in said storing means in a displaying manner corresponding to the signal receiving intensity of the available television channels detected by said detecting means.

11. A receiver according to claim 9, wherein:
said searching means repeatedly performs an automatic tuning operation of television signal waves for several times to search for an available television channel;
said detecting means detects a signal receiving intensity of a television signal wave of the available television channel searched by said searching means depending on how many times the corresponding television signal wave has been tuned in by said searching means; and
said storing means stores the available television channels searched by said searching means together with the signal receiving intensity of the corresponding television signal waves detected by said detecting means.

12. A receiver according to claim 9, further comprising automatic fine tuning (AFT) means for performing an automatic fine tuning (AFT) operation to detect a television signal, for thereby developing an AFT receiving intensity of the corresponding television signal wave of the available television channel depending on a signal level of the AFT signal developed by said AFT means.

13. A receiver according to claim 9, further comprising:
automatic gain control (AGC) means for developing an AGC signal to control a gain of a television signal of the available television channel searched by said searching means; and
wherein said detecting means detects a signal receiving intensity of the television signal wave of the available television channel depending on a signal level of the AGC signal developed by said AGC means.

14. A receiver according to claim 9, wherein said display means successively displays the respective available television channels stored in said storing means for different durations associated with the signal receiving intensity of the corresponding available television channels detected by said detecting means.

15. A receiver according to claim 3, wherein said display means displays a list of the available television channels searched by said searching means while said display means successively displays television signals of the available television channels received by said receiving means for a predetermined period of time.

16. A receiver according to claim 3, further comprising channel selecting means for compulsorily controlling said receiving means so as to receive plural channels of television signals in a reverse order of television channels while said receiving means is in a receiving operation.

17. A receiver comprising:
network memory means for storing data corresponding at least to geographical areas, broadcasting stations at the geographical areas, and network relations between key stations and the broadcasting stations;
area designating means for designating a geographical area stored in said network memory means;
guide display means for displaying station-selection guide information of a geographical area designated by said area designating means, which station-selection guide information includes a network relation between the broadcasting stations of the area designated by said area designating means and relevant key stations;
map memory means for previously storing map images of the geographical areas stored in said network memory means; and
map display means for displaying a map image stored in said map memory means; and
wherein said geographical area designating means designates areas stored in said network memory means when a map image displayed by said map display means is selected.

18. A recorder according to claim 17, wherein:
said area designating means includes means for successively designating a first geographical area and a second geographical area into which the first geographical area is divided, and
said guide display means displays station-selection guide information of the second geographical area designated by said area designating means.

19. A receiver according to claim 17, further comprising:
station selecting means for selecting one of broadcasting stations included in the station-selection guide information displayed by said guide display means; and
signal receiving means for receiving a broadcasting signal wave of the broadcasting station selected by said station selecting means.

20. A receiver according to claim 17, further comprising:
searching means for performing an automatic tuning operation of broadcasting signal waves of broadcasting stations in the geographical area which is stored in said network memory means and designated by said area designating means, to search for an available broadcasting station;
signal intensity memory means for detecting a signal receiving intensity of each of broadcasting signal waves of the available broadcasting stations searched by said searching means; and
signal intensity memory means for storing the signal receiving intensity of the broadcasting signal waves detected by said signal intensity detecting means; and
wherein said guide display means displays station-selecting guide information that indicates a network relation between key stations and broadcasting stations at the geographical area designated by said area designating means, in a displaying manner associated with the signal receiving intensity stored in said intensity memory means.

21. A receiver according to claim 20, wherein:
said searching means includes means for repeatedly performing an automatic tuning operation of broadcasting signal waves of broadcasting stations in the geographical area designated by said area designating means for several times, to search for an available and receivable broadcasting signal wave corresponding to a broadcasting station; and
said detecting means detects a signal receiving intensity of a broadcasting signal wave of the available broadcasting station searched by said searching means depending on how many times the corresponding broadcasting signal wave has been tuned in by said searching means.

22. A receiver according to claim 20, further comprising:

automatic fine tuning (AFT) means for performing an automatic fine tuning (AFT) operation to detect a broadcasting signal wave, for thereby developing an AFT signal; and wherein said detecting means detects a signal receiving intensity of the corresponding broadcasting signal wave of the available broadcasting station depending on a signal level of the AFT signal developed by said AFT means.

23. A receiver according to claim 20, further comprising:

automatic gain control (AGC) means for developing an AGC signal to control a gain of a broadcasting signal of the available broadcasting station; and wherein said detecting means detects a signal receiving intensity of the broadcast station searched by said searching means depending on a signal level of the AGC signal developed by said AGC means.

24. A receiver comprising:

station selecting means for selecting a broadcasting station based on a broadcasting signal wave;

detecting means for detecting a signal receiving intensity of a broadcasting signal wave of the broadcasting station at a time when the broadcasting station is selected by said station selecting means;

memory means for storing the broadcasting stations selected by said station selecting means and the signal receiving intensity of the corresponding broadcasting signal waves detected by said detecting means;

display means for displaying the broadcasting stations stored in said memory means in a displaying manner associated with the signal receiving intensity of the broadcasting signal waves detected by said detecting means;

wherein said station selecting means includes means for repeatedly performing an automatic tuning operation of broadcasting signal waves of broadcasting stations for several times to search for an available and receivable broadcasting signal wave corresponding to a broadcasting station;

wherein said detecting means obtains, as a signal receiving intensity of a broadcasting signal wave, data representative of how many times the broadcasting signal wave of the corresponding broadcasting station has been tuned in by said station selecting means; and said memory means storing the broadcasting stations searched by said searching means together with the signal receiving intensity of said corresponding broadcasting signal waves detected by said detecting means.

25. A receiver comprising:

network memory means for storing data corresponding at least to geographical areas, broadcasting stations at the geographical areas, and network relations between key stations and the broadcasting stations;

area designating means for designating a geographical area stored in said network memory means;

guide display means for displaying station-selection guide information of a geographical area designated by said area designating means, which station-selection guide information includes a network relation between the broadcasting stations of the geographical area designated by said area designating means and relevant key stations;

searching means for performing an automatic tuning operation of broadcasting signal waves of broadcasting stations in the geographical area which is stored in said network memory means and designated by said area designating means, to search for an available broadcasting station;

signal intensity memory means for detecting a signal receiving intensity of each of broadcasting signal waves of the available broadcasting stations searched by said searching means; and signal intensity memory means for storing the signal receiving intensity of the broadcasting signal waves detected by said signal intensity detecting means; and wherein said guide display means displays station-selecting guide information that indicates a network relation between key stations and broadcasting stations at the geographical area designated by said area designating means, in a displaying manner associated with the signal receiving intensity stored in said intensity memory means.

26. A receiver according to claim 25, wherein:

said searching means includes means for repeatedly performing an automatic tuning operation of broadcasting signal waves of broadcasting stations in the geographical area designated by said area designating means for several times, to search for an available and receivable broadcasting signal wave corresponding to a broadcasting station; and said detecting means detects a signal receiving intensity of a broadcasting signal wave of the available broadcasting station searched by said searching means depending on how many times the corresponding broadcasting signal wave has been tuned in by said searching means.

27. A receiver according to claim 25, further comprising:

automatic fine tuning (AFT) means for performing an automatic fine tuning (AFT) operation to detect a broadcasting signal wave, for thereby developing an AFT signal; and wherein said detecting means detects a signal receiving intensity of the corresponding broadcasting signal wave of the available broadcasting station depending on a signal level of the AFT signal developed by said AFT means.

28. A receiver according to claim 25, further comprising:

automatic gain control (AGC) means for developing an AGC signal to control a gain of a broadcasting signal of the available broadcasting station; and wherein said detecting means detects a signal receiving intensity of the broadcast station searched by said searching means depending on a signal level of the AGC signal developed by said AGC means.

* * * * *

UNITED STATES PATENT AND TRADEMARK OFFICE
CERTIFICATE OF CORRECTION

PATENT NO. : 5,371,550

DATED : December 6, 1994

INVENTOR(S) : SHIBUTANI et al

It is certified that error appears in the above-identified patent and that said Letters Patent is hereby corrected as shown below:

Title page:

[30] "Foreign Application Priority Data",

"3-36368" should be --4-36368--; and

"3-170496" should be --4-170496--

[56] References Cited, under "U.S. PATENT DOCUMENTS",

"5,152,511" should be --5,152,011--

Signed and Sealed this

Nineteenth Day of December, 1995

Attest:

*Attesting Officer*

BRUCE LEHMAN

*Commissioner of Patents and Trademarks*